(12) United States Patent
Lovens

(10) Patent No.: US 9,930,730 B2
(45) Date of Patent: *Mar. 27, 2018

(54) VARIABLE WIDTH TRANSVERSE FLUX ELECTRIC INDUCTION COILS

(71) Applicant: Inductotherm Corp., Rancocas, NJ (US)

(72) Inventor: Jean Lovens, Embourg (BE)

(73) Assignee: INDUCTOTHERM CORP., Rancocas, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,974

(22) Filed: Sep. 11, 2016

(65) Prior Publication Data

US 2016/0381737 A1    Dec. 29, 2016

Related U.S. Application Data

(62) Division of application No. 12/423,418, filed on Apr. 14, 2009, now Pat. No. 9,445,460.

(Continued)

(51) Int. Cl.
    *H05B 6/10*    (2006.01)
    *H05B 6/40*    (2006.01)
    (Continued)

(52) U.S. Cl.
    CPC ............ *H05B 6/104* (2013.01); *H05B 6/40* (2013.01); *C21D 9/60* (2013.01); *H05B 6/36* (2013.01);
    (Continued)

(58) Field of Classification Search
    CPC . C21D 9/60; H05B 6/02; H05B 6/362; H05B 6/04; H05B 6/102; H05B 6/105; H05B 6/06; H05B 6/34; H05B 6/24; H05B 6/16; H05B 6/36
    USPC ....... 219/645, 646, 653, 670, 671, 672, 673, 219/675, 676, 635, 637, 674; 373/146, 373/152, 153, 160
    See application file for complete search history.

(56) References Cited

U.S. PATENT DOCUMENTS 4,778,971 A * 10/1988 Sakimoto ................ C21D 9/60
                                                        219/645
5,495,094 A *  2/1996 Rowan ..................... H05B 6/36
                                                        219/645
(Continued)

FOREIGN PATENT DOCUMENTS

WO    WO 2007115086 A2 * 10/2007 ............. H05B 6/104

*Primary Examiner* — Dana Ross
*Assistant Examiner* — Kuangyue Chen
(74) *Attorney, Agent, or Firm* — Philip O. Post

(57) ABSTRACT

A variable width transverse flux electric inductor has a fixed powered coil section and associated box-like moveable passive coil sections that electromagnetically couple with magnetic flux generated by current flowing through the fixed powered section. The passive coil sections can be transversely moved across the workpiece to accommodate induction heating of workpieces having different widths or track movement of the workpiece. Alternatively the fixed powered coil section and associated moveable coil sections may be connected to each other through flexible connections, sliding contacts or other means, such as clamps, so that an electrical connection can be maintained between both in any relative position.

14 Claims, 24 Drawing Sheets

Related U.S. Application Data

(60) Provisional application No. 61/044,545, filed on Apr. 14, 2008.

(51) Int. Cl.
    *H05B 6/36*         (2006.01)
    *C21D 9/60*         (2006.01)

(52) U.S. Cl.
    CPC ........ *H05B 6/362* (2013.01); *H05B 2206/022* (2013.01); *Y02P 10/253* (2015.11)

(56) References Cited

U.S. PATENT DOCUMENTS

| | | | | |
|---|---|---|---|---|
| 6,570,141 B2* | 5/2003 | Ross | ...................... | H05B 6/365 |
| | | | | 148/568 |
| 6,576,878 B2* | 6/2003 | Thorpe | .................. | H05B 6/365 |
| | | | | 219/645 |
| 9,445,460 B2* | 9/2016 | Lovens | .................. | H05B 6/104 |
| 2003/0192878 A1* | 10/2003 | Anderhuber | ........... | C21D 9/561 |
| | | | | 219/600 |
| 2007/0181567 A1* | 8/2007 | Lovens | .................... | H05B 6/26 |
| | | | | 219/651 |

* cited by examiner

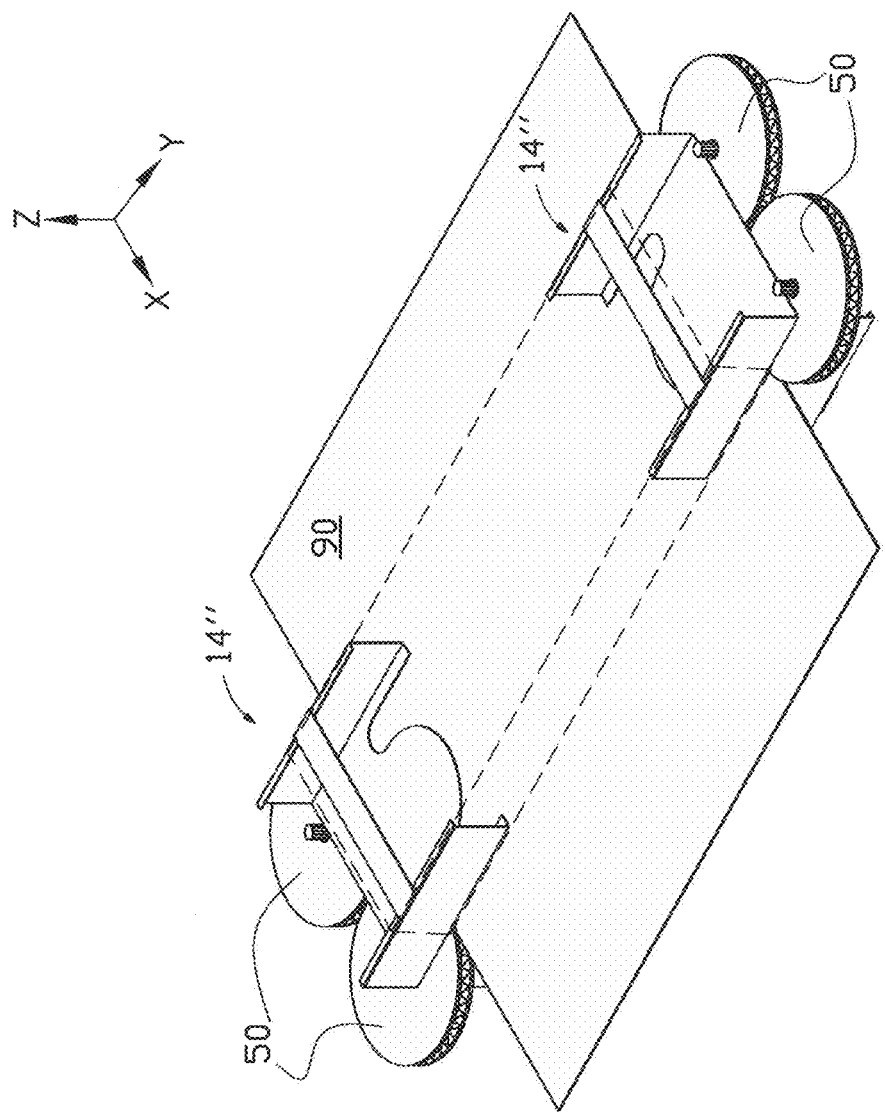

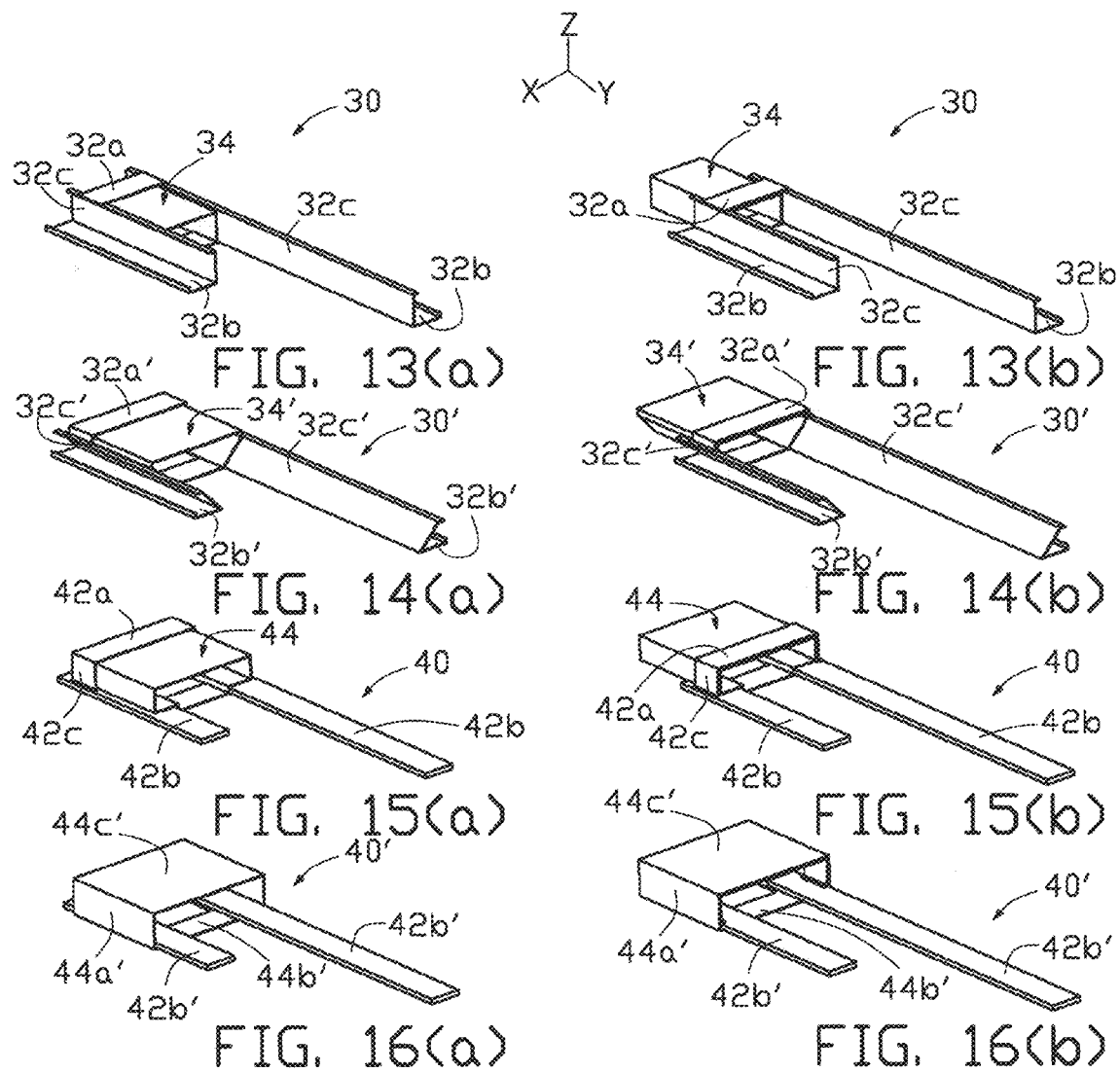

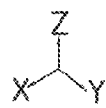
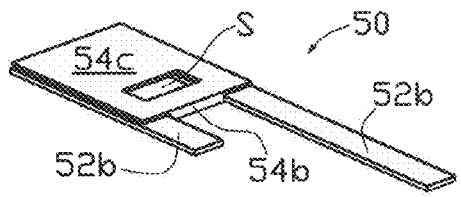
FIG. 17(a)
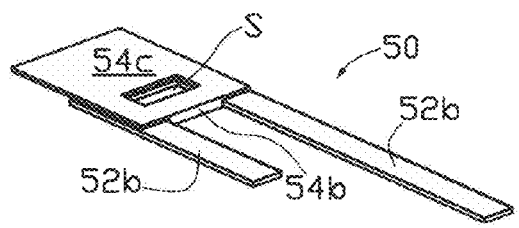
FIG. 17(b)
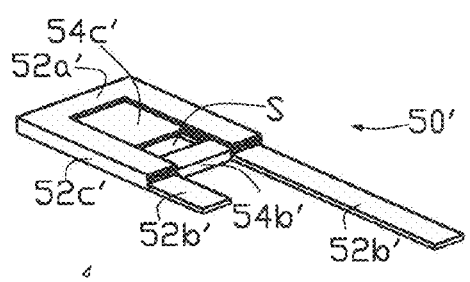
FIG. 18(a)
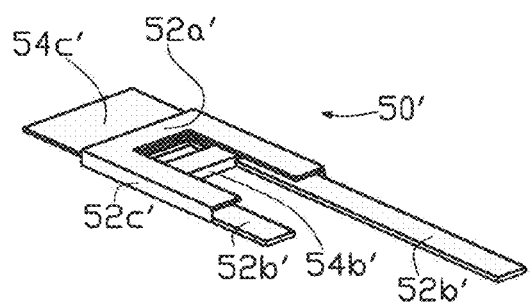
FIG. 18(b)
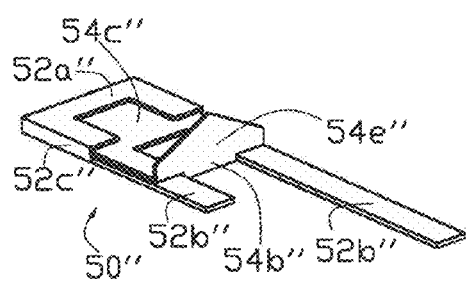
FIG. 19(a)
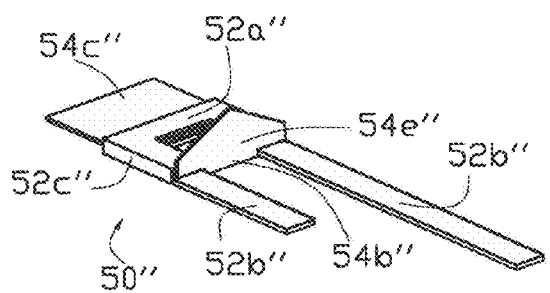
FIG. 19(b)

US 9,930,730 B2

VARIABLE WIDTH TRANSVERSE FLUX ELECTRIC INDUCTION COILS

CROSS REFERENCE TO RELATED APPLICATIONS

This is a divisional application of application Ser. No. 12/423,418, filed Apr. 14, 2009, which application claims the benefit of U.S. Provisional Application No. 61/044,545, filed Apr. 14, 2008 both of which applications are hereby incorporated herein by reference in their entireties.

FIELD OF THE INVENTION

The present invention relates to transverse flux electric induction coils, and in particular, to such induction coils when used to heat a stationary or moving planarly oriented electrically conductive workpiece.

BACKGROUND OF THE INVENTION

U.S. Pat. No. 6,570,141 B2 discloses a variable width transverse flux coil that includes moveable sections of the coil that are connected to a power supply. Such an arrangement requires flexible power connections between the coil sections and power supply, and requires moveable assemblies that are large since their lengths are directly related to the maximum width of the strip to be heated, and, as a consequence, are heavy, particularly if they include magnetic flux concentrators.

It is one object of the present invention to provide a transverse flux electric induction coil comprising a fixed powered coil section and one or more moveable passive coil sections that provide a convenient means for adjusting the width of the coil to the width of an electrically conductive workpiece that is to be inductively heated.

It is another object of the present invention to provide a transverse flux electric induction coil comprising a fixed powered coil section and one or more moveable passive coil sections that provide a convenient means for adjusting a transverse end, or ends of the coil if the position of the electrically conductive workpiece being inductively heated wanders, or weaves, in the transverse direction during the heating process. The moveable passive coil sections can be substantially shorter than the width of the electrically conductive workpiece. Consequently they are lightweight and can easily be moved to track the instantaneous positions of the opposing edges of the electrically conductive workpieces.

BRIEF DESCRIPTION OF THE INVENTION

In one aspect, the present invention is an apparatus for, and method of, transverse flux electric induction heating of a planarly oriented electrically conductive workpiece that may be in the form of a continuous or discrete sheet or strip. A transverse flux electric induction coil comprises a fixed powered coil section and one or more moveable passive coil sections that electromagnetically couple with the fixed powered coil section. Alternatively the moveable coil sections may have moveable direct electrical connections to the fixed section. An electrically conductive workpiece is generally positioned between a pair of the transverse flux induction coils. In other applications a single coil may be used. At least one AC power supply is suitably connected to the fixed powered coil section to supply single phase AC power to the coil. The moveable passive coil sections can be moved transversely across the electrically conductive workpiece to accommodate different workpiece widths; different heating profiles; or the wandering of the workpiece in a direction perpendicular to the direction of its intended movement between the coils.

In another aspect the present invention is apparatus for, and method of, transverse flux induction heating with one or more transverse flux induction coils. The transverse flux electric induction coil comprises a fixed planar coil section formed from at least a pair of transverse sections co-planarly spaced apart from each other. The pair of transverse sections is joined together near each adjacent opposing end by a bridge section to form at least a one turn coil. An alternating current power source is connected to the fixed planar coil section to create an alternating magnetic flux field around the fixed planar coil section. At least one box-like moveable coil section is slidably, by mechanical means, connected to at least one end of the fixed planar coil section while being electrically isolated from, and electromagnetically coupled with, the magnetic flux field at least around the bridge section. A magnetic core may be used to increase the magnetic flux coupling between the bridge section and a section of the at least one box-like moveable coil section. A riser section may be connected between each one of the pair of transverse sections and the bridge section to serve as an intermediate section between the transverse sections and the bridge section.

The above and other aspects of the invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 7 is a simplified partial isometric view of one example of guide rolls that can be used to have the moveable passive coil sections track the transverse edges of a workpiece moving below the passive coil sections shown in the figure.

FIG. 13(a) through FIG. 13(e) is a partial isometric view of another example of a transverse flux induction coil of the present invention.

FIG. 14(a) through FIG. 14(e) is a partial isometric view of another example of a transverse flux induction coil of the present invention.

FIG. 15(a) through FIG. 15(e) is a partial isometric view of another example of a transverse flux induction coil of the present invention.

FIG. 16(a) through FIG. 16(e) is a partial isometric view of another example of a transverse flux induction coil of the present invention.

FIG. 17(a) through FIG. 17(d) is a partial isometric view of another example of a transverse flux induction coil of the present invention.

FIG. 18(a) through FIG. 18(d) is a partial isometric view of another example of a transverse flux induction coil of the present invention.

FIG. 19(a) through FIG. 19(d) is a partial isometric view of another example of a transverse flux induction coil of the present invention.

DETAILED DESCRIPTION OF THE INVENTION

The term workpiece as used herein refers to a planarly oriented electrically conductive material that may be in the form of a strip or sheet, either continuous, or consisting of strips or sheets having discrete lengths. The workpiece may be inductively heated either to change the metallurgical properties of the workpiece, or to achieve a bonding process, such as, but not limited to, drying a liquid bonding material deposited on a surface of the workpiece. Further the workpiece may move above, below or between one or more of the transverse flux electric induction coils of the present invention, or be stationary above, below or between the one or more coils during inductive heating of the workpiece.

While the below examples of the invention generally describe a pair of transverse flux induction coils of the present invention positioned on opposing sides of the workpiece, in other examples of the invention, only one transverse flux induction coil of the present invention may be used over one side of the workpiece.

Figure 1:
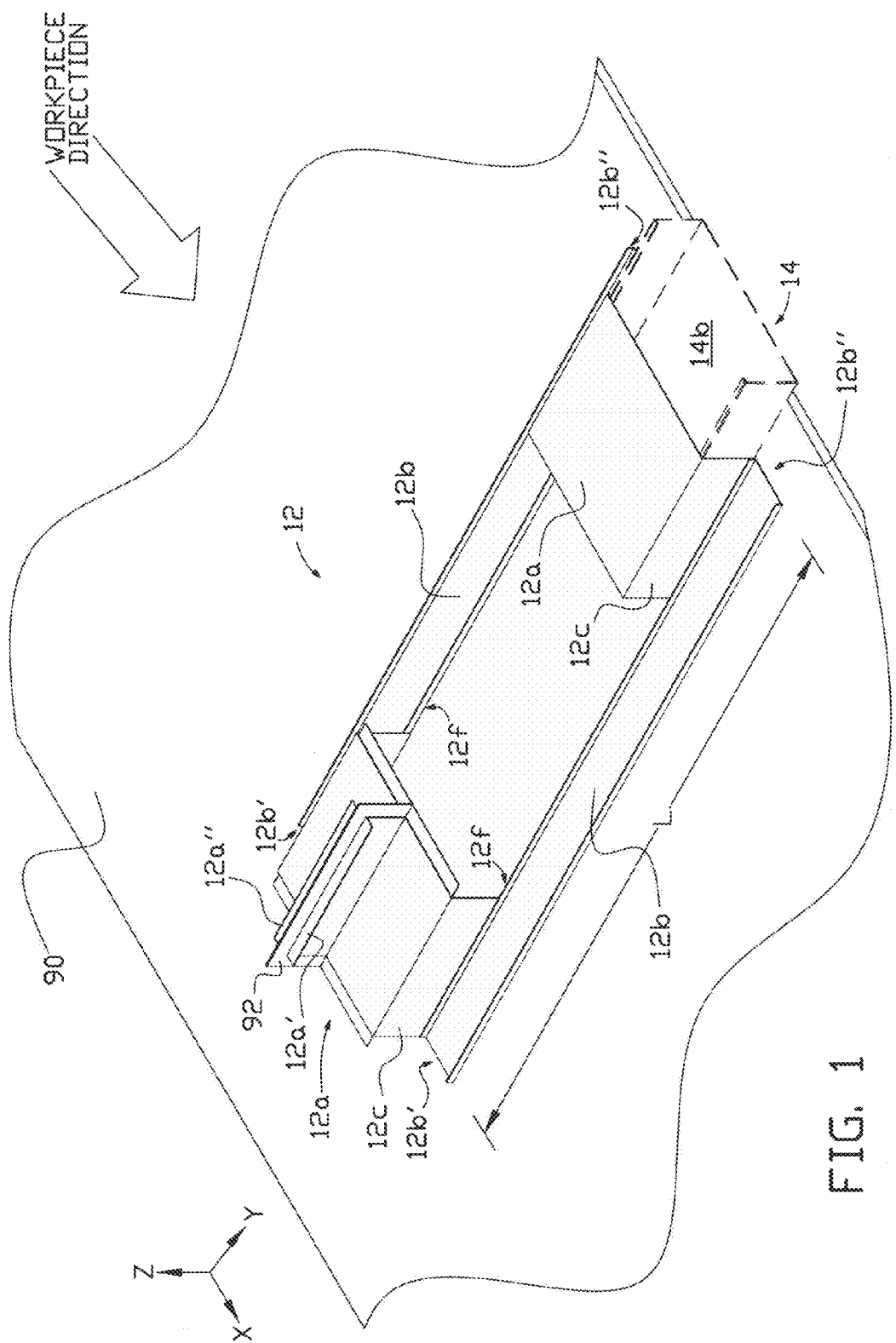
FIG. 1 is an isometric view of one example of a fixed powered coil section of the present invention shown in relationship to a moveable passive coil section and a workpiece.
Figure 2:
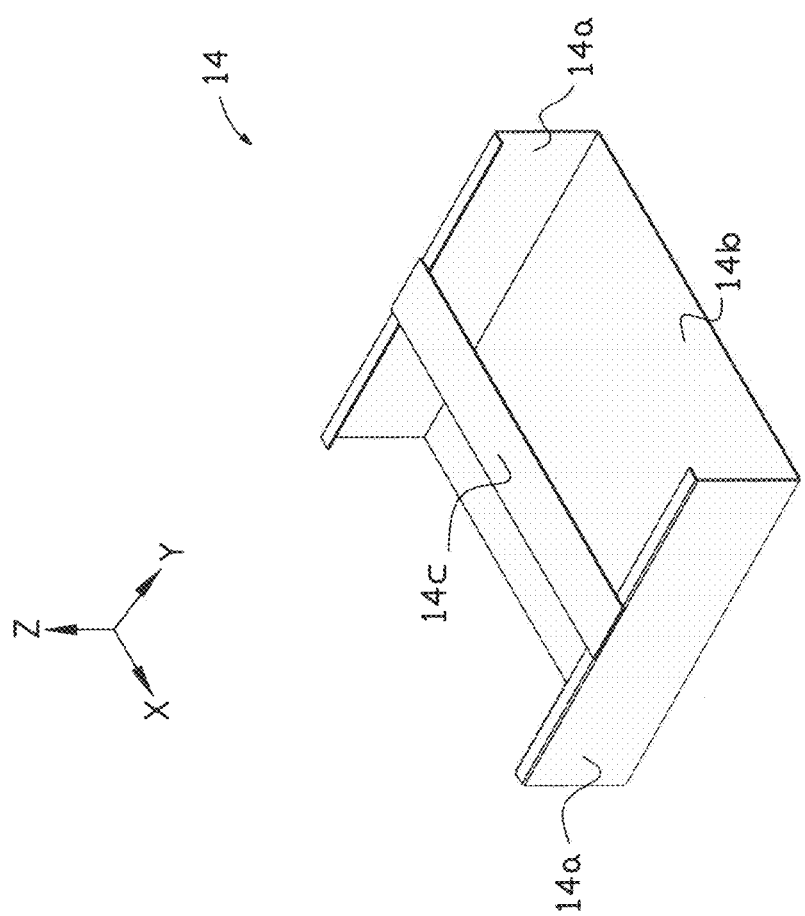
FIG. 2 is an isometric view of one example of a moveable passive coil section of the present invention.
Figure 3:
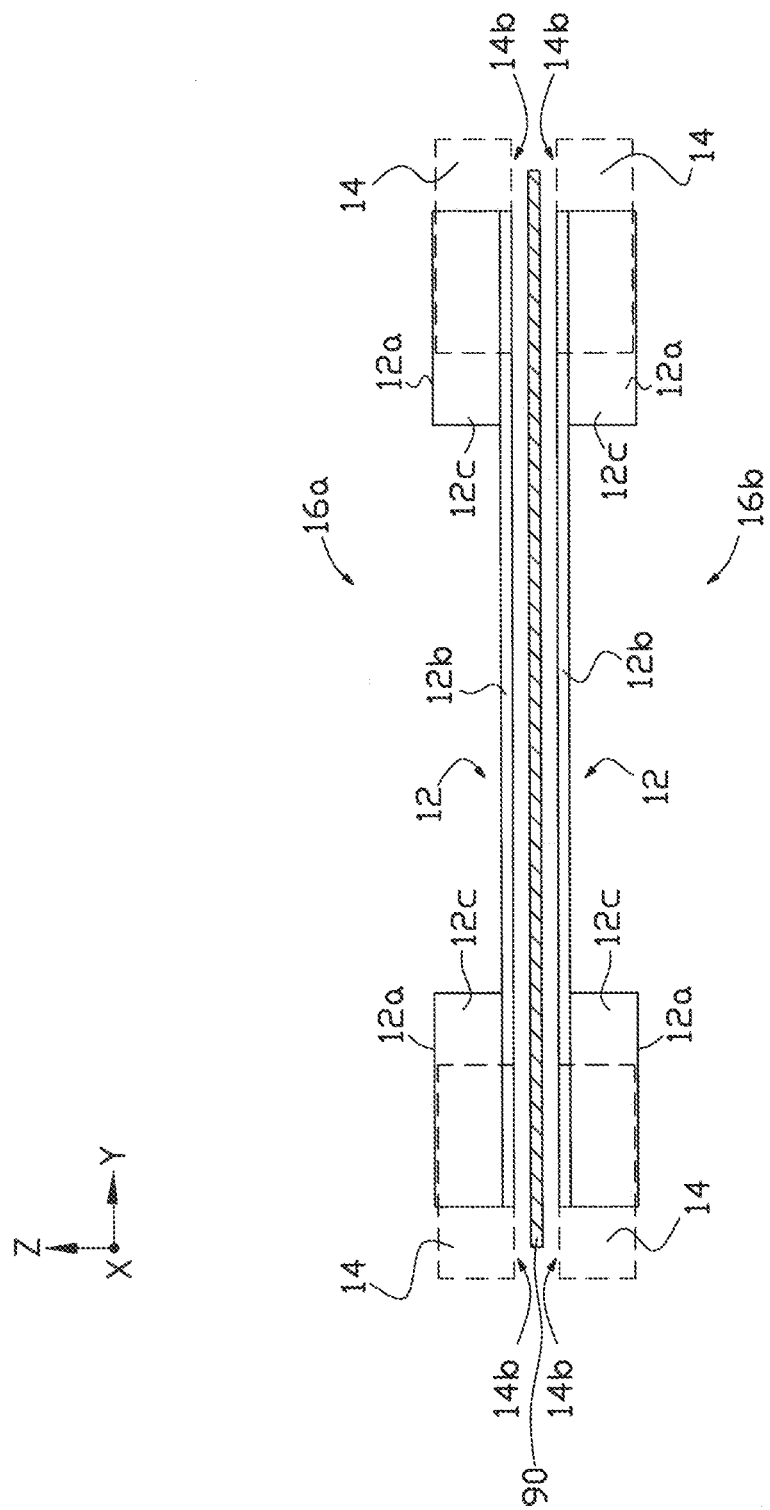
FIG. 3 is a cross sectional elevation view of one example of a pair of the transverse flux electric induction coils of the present invention.

Referring now to the drawings, wherein like numerals indicate like elements, there is shown in FIG. 1, FIG. 2 and FIG. 3 one example of the transverse flux electric induction coil assembly of the present invention. An orthogonal reference space is established with the X-Y plane defining the plane of workpiece 90, which, in this non-limiting example, moves between upper and lower induction coils (FIG. 3) in the positive X-direction, as indicated by the direction of the arrow, with the width, or transverse, of the workpiece defined in the Y-direction. The positive Z-direction points in the direction perpendicular to the upper surface of the workpiece.

The upper or lower induction coil comprises a fixed powered coil section and two moveable passive coil sections as further described below.

FIG. 1 illustrates one non-limiting example of a fixed powered coil section of the present invention. In the illustration of FIG. 1 the fixed powered coil section is used in an upper induction coil with positional reference to workpiece 90. Only one moveable passive coil section 14 is shown (in dashed lines) in FIG. 1 to illustrate positioning of a moveable passive coil section relative to the fixed powered coil section. While generally moveable passive coil sections are utilized at each opposing end of the fixed coil section, in some application the arrangement may be asymmetric with a moveable passive coil section at only one end of the fixed coil section. Fixed powered coil section 12 has its length, L, oriented (in the Y-direction) substantially perpendicular to the direction (X-direction) of the workpiece passing below coil section 12, as indicated by the arrow labeled WORKPIECE DIRECTION. In other examples of the invention, the length of the fixed powered coil section may be skewed from perpendicular relative to the direction of the workpiece. Fixed powered coil section 12 comprises bridge sections 12a at opposing ends of section 12. The bridge sections are connected to leg sections 12b by riser sections 12c. Leg sections 12b are a pair of transverse sections co-planarly spaced apart from each other and joined together near each adjacent opposing ends 12b' and 12b" with a bridge section 12a by means of interconnecting riser sections 12c, which extend away from the surface of workpiece 90. In FIG. 1 one of the bridge sections 12a is utilized to connect coil section 12 to an alternating current (AC) power supply not shown in the figure. For example electrical connections to the power supply can be made at bridge section segments 12a' and 12a", which are separated by electrical insulation 92. The fixed powered coil section may be formed from any suitable electrically conductive material, such as a copper alloy, formed, for example, as a sheet, tube or extrusion. The powered coil section may be fabricated from a continuous piece of material or suitably joined sections. If cooling of the coil section is required, one or more cooling passages may be provided within the coil section or external to the coil section, for example, by at least partially surrounding the coil section with a tubular material providing the cooling passages. A cooling medium, such as water, may be supplied through the cooling passages.

Figure 8:
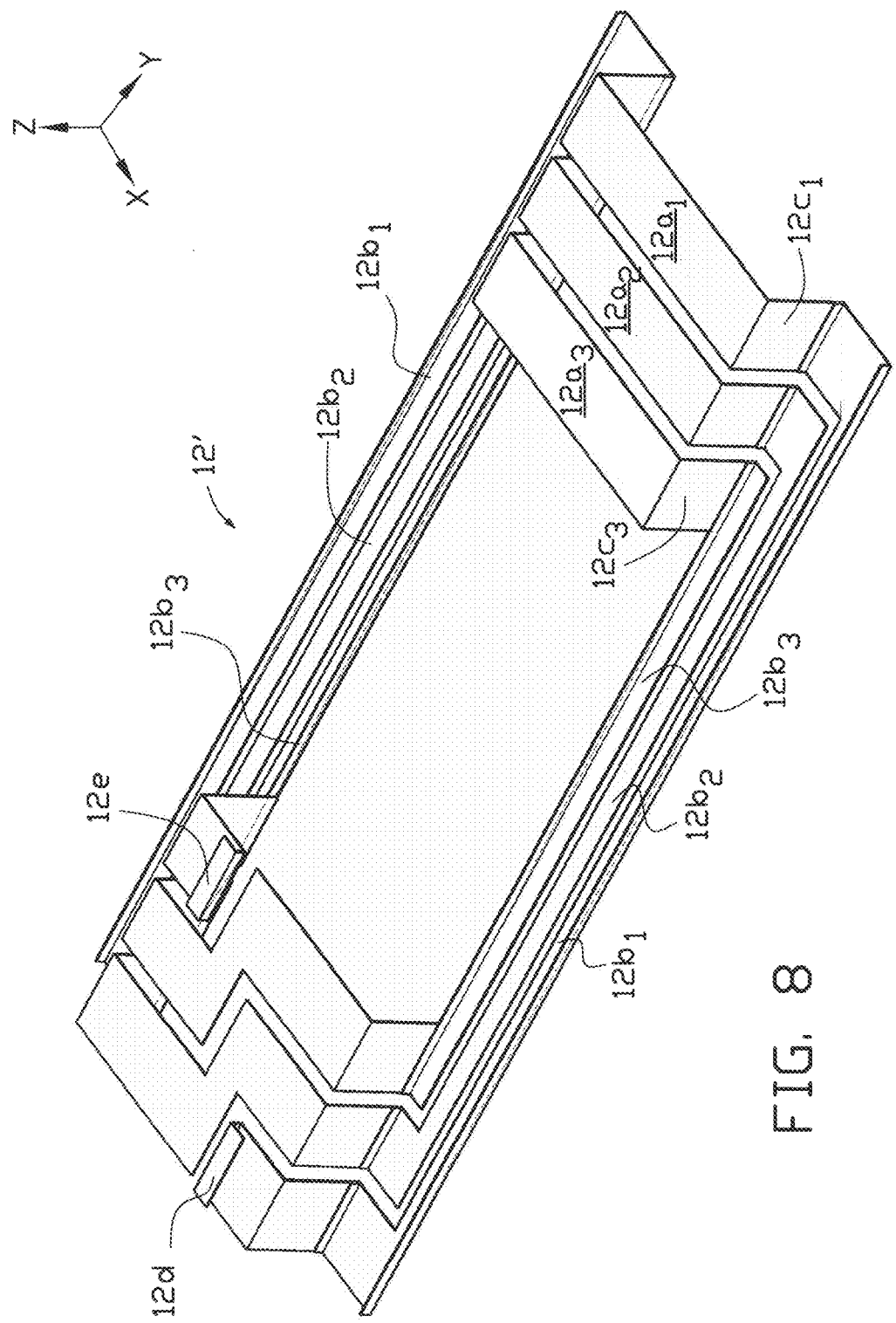
FIG. 8 is an isometric view of one example of a fixed powered coil section used in the present invention wherein the coil section comprises a three turn coil.

The fixed powered coil section may be formed as a single turn coil, or as a multi-turn coil. For example in FIG. 8 fixed powered coil section 12' comprises a three turn coil shown in spatial orientation for use in an upper induction coil. Each of the three coil turns $12'_1$, $12'_2$ and $12'_3$ has its own bridge ($12a_1$, $12a_2$ and $12a_3$), leg ($12b_1$, $12b_2$ and $12b_3$), and riser ($12c_1$, $12c_2$ and $12c_3$) sections, with the sections in each coil turn electrically isolated from each other. Opposing ends 12d and 12e of the combination of the three coil turns are suitably connected to an AC power supply.

Figure 9:
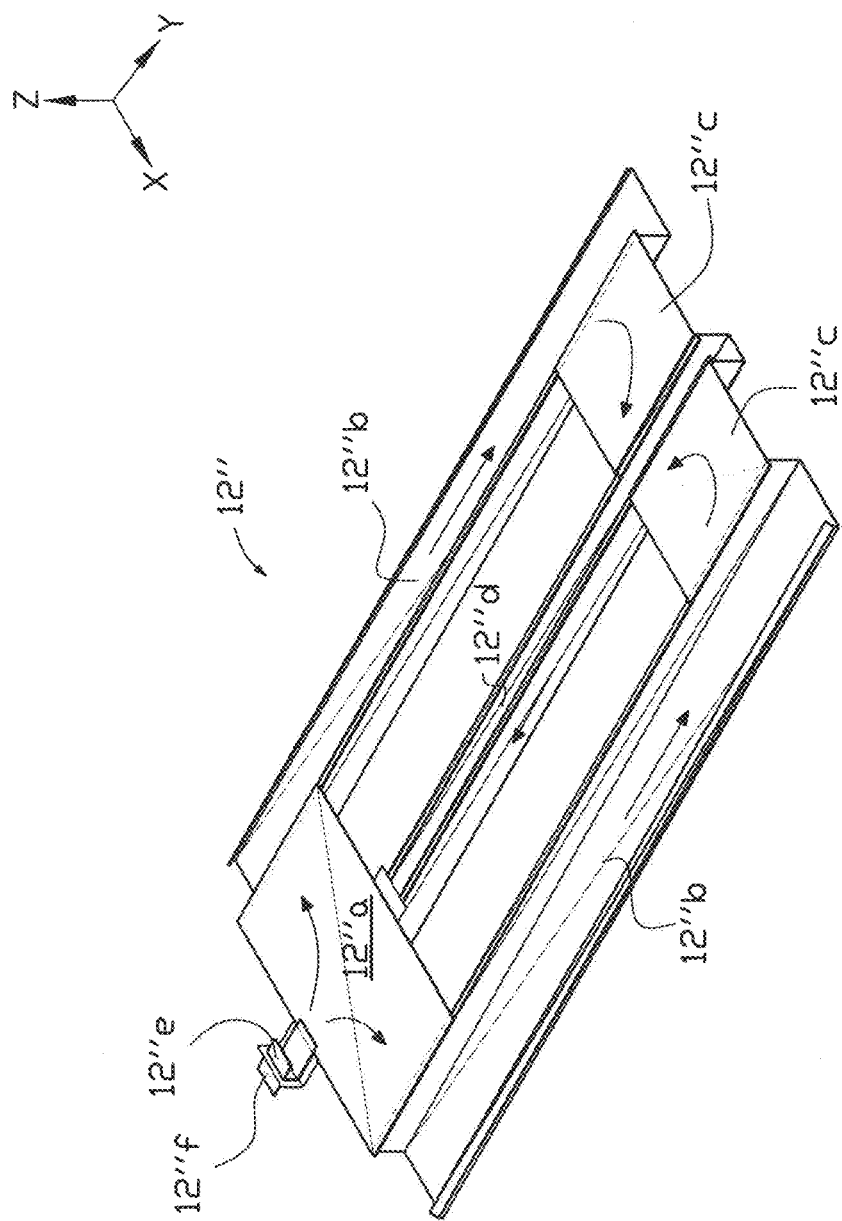
FIG. 9 is an isometric view of another example of a fixed powered coil section used in the present invention.

The fixed powered coil section may be formed as a single loop coil, or as a multi-loop coil. For example in FIG. 9 fixed powered coil section 12" comprises a double loop coil shown in spatial orientation for use in an upper induction coil. Instantaneous AC current flow may be as indicated by the arrows in the figure. That is current flows from an AC power source (not shown in the figure) connected to terminal 12″*e* into bridge section 12″*a* connecting to outer leg sections 12″*b*, and then through bridge sections 12″*c* connecting each outer leg section to common return middle leg section 12″*d*, which terminates at a return connection 12″*f* to the AC power source.

FIG. 2 illustrates one non-limiting example of a moveable passive coil section of the present invention shown in spatial orientation for use in an upper coil assembly as illustrated, for example, in dashed lines in FIG. 1. Moveable passive coil section 14 is box-like in shape, namely a three sided, open ended box, or "drawer" structure having opposing side sections 14*a* joined by bridge section 14*b*. Slat section 14*c* connecting opposing side sections 14*a* provides brace support to maintain the box structure and a closed electrical path around the side sections of the moveable passive coil section. The movable passive coil section may be fabricated from a continuous piece of material or suitably joined sections. If cooling of the coil section is required, one or more cooling passages may be provided within the coil section or external to the coil section, for example, by at least partially surrounding the coil section with a tubular material providing the cooling passages. A cooling medium, such as water, may be supplied through the cooling passages. The moveable passive coil section may be formed as a single turn coil, as shown in FIG. 2, or as a multi-turn coil that is used in combination with a single or multi-turn fixed powered coil section.

FIG. 3 illustrates one non-limiting arrangement of a pair of transverse flux induction coils 16*a* and 16*b* of the present invention that comprises an upper and lower induction coil, respectively. Each transverse flux induction coil comprises a fixed powered coil section 12 and a pair of moveable passive coil sections 14. Movable passive coil sections 14 are configured to fit in the space bounded by the workpiece facing surface of the coil bridge sections 12*a* and the interior surfaces of riser sections 12*c*. The workpiece facing bridge section 14*b* of the passive coil sections may lie in the same horizontal plane as the leg sections 12*b* adjacent to the workpiece facing bridge section of the moveable section. Alternatively the workpiece facing bridge sections 14*b* may be formed with areas closer to, or farther away from, the workpiece surface depending upon the induction heating temperature profiles desired at the edges of the workpiece above or below the moveable passive coil sections. Electrical insulation is provided at least between interfacing surfaces of the fixed powered coil section 12 and the moveable passive coil sections 14. The electrical insulation may be in the form of a separate insulating material or an insulative coating applied to either the appropriate sections of the fixed or moveable (or both coil sections. With this arrangement coil sections 14 can be moved (slid) in a direction (Y-direction) transverse to the edges of the workpiece to accommodate workpieces of different widths; to alter edge heating patterns of the workpiece; or to have the width of the upper and lower coil assemblies track the edges of a workpiece moving in a direction (weaving in the Y-direction) perpendicular to the movement of the workpiece between the upper and lower induction coil. Movement of a moveable passive coil section is similar to that of a drawer in an enclosure where the drawer is the moveable passive coil section, and the volume defined by the interior of bridge 12*a* and riser 12*c* sections is the enclosure.

Figure 4:
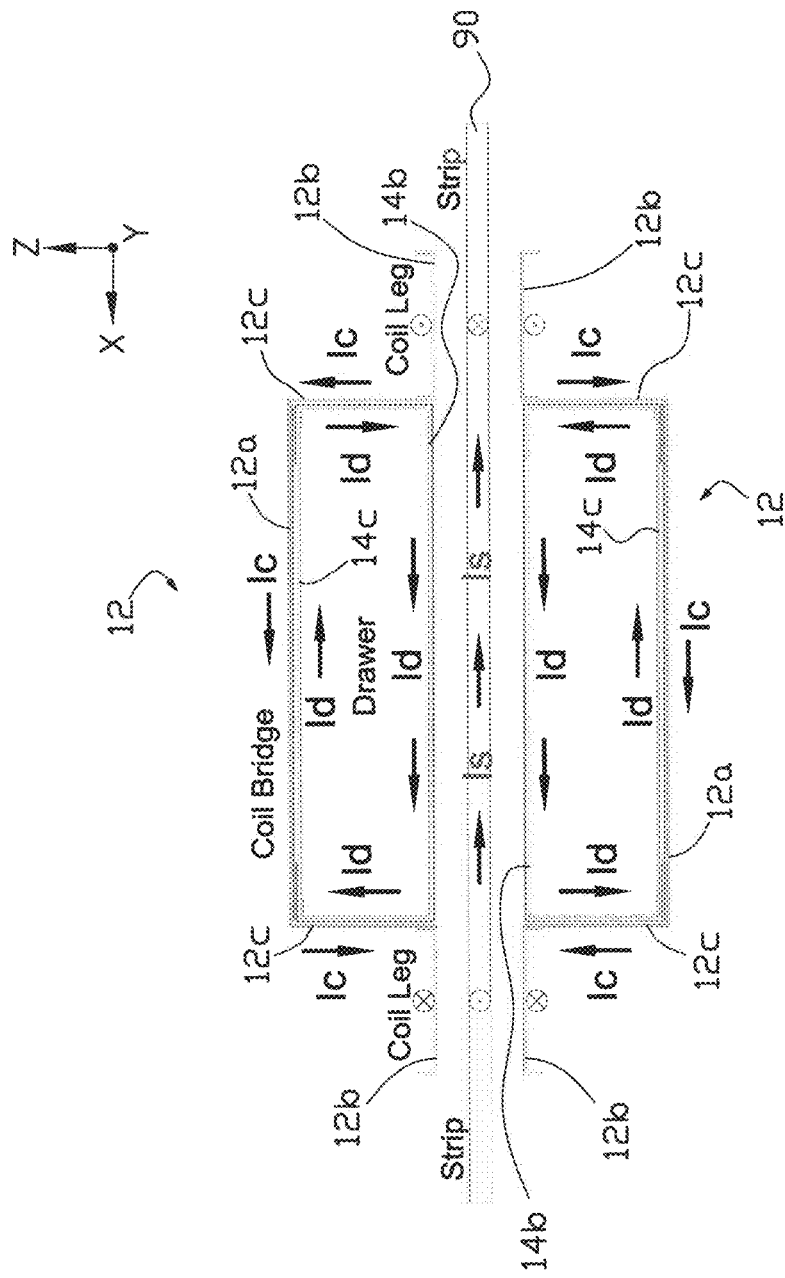
FIG. 4 illustrates current flow patterns in fixed powered coil sections and associated moveable passive coil sections positioned above and below a workpiece that is statically positioned or moving between the upper and lower induction coils.

Each fixed powered coil section and associated pair of moveable passive coil sections perform electrically as a transformer with one primary (fixed section) and two secondaries (movable sections). That is current supplied to the fixed powered coil section flows through the fixed powered coil section and generates electromagnetic flux that magnetically couples with the associated pair of passive coil sections to induce a current flow in the associated passive coil sections. Current flow in a passive coil section generates a secondary electromagnetic flux that couples with the workpiece to inductively heat the workpiece. FIG. 4 illustrates instantaneous AC current flow patterns (in directions indicated by the arrows) in fixed powered coil sections 12 (current designated $I_c$) and associated moveable passive sections 14 (current designated $I_d$). There is flux cancellation by opposing current flows through bridge 12*a* and riser 12*c* sections of a fixed powered coil section and adjacent side sections 14*a* and slat section 14*c* of a moveable passive coil section as illustrated in FIG. 4. Instantaneous current flow (designated $I_d$) in bridge sections 14*b* facing workpiece 90 and leg sections 12*c* (designated $I_c$), which is symbolically illustrated by a circled cross for current flow into the plane of the drawing sheet, and by a circled dot for current flow out of the plane of the drawing sheet, generates flux that inductively heats the workpiece.

Maximum inward and maximum outward allowable movement (Y-direction) of the passive coil sections is defined by the minimum flux coupling sustainable for a particular application. One approach to maintaining the minimum flux coupling substantially independent of the position of the moveable section relative to the fixed powered coil section is to make slat 14*c* of the moveable section substantially narrower (in the Y-direction) than bridge 12*a* of the fixed section. Alternatively as illustrated in some examples of the invention below, (for example, FIG. 13(*a*) through FIG. 13(*e*)) a relatively wide moveable slat 34*c* is coupled with a substantially narrower fixed bridge 32*a*.

Figure 5:
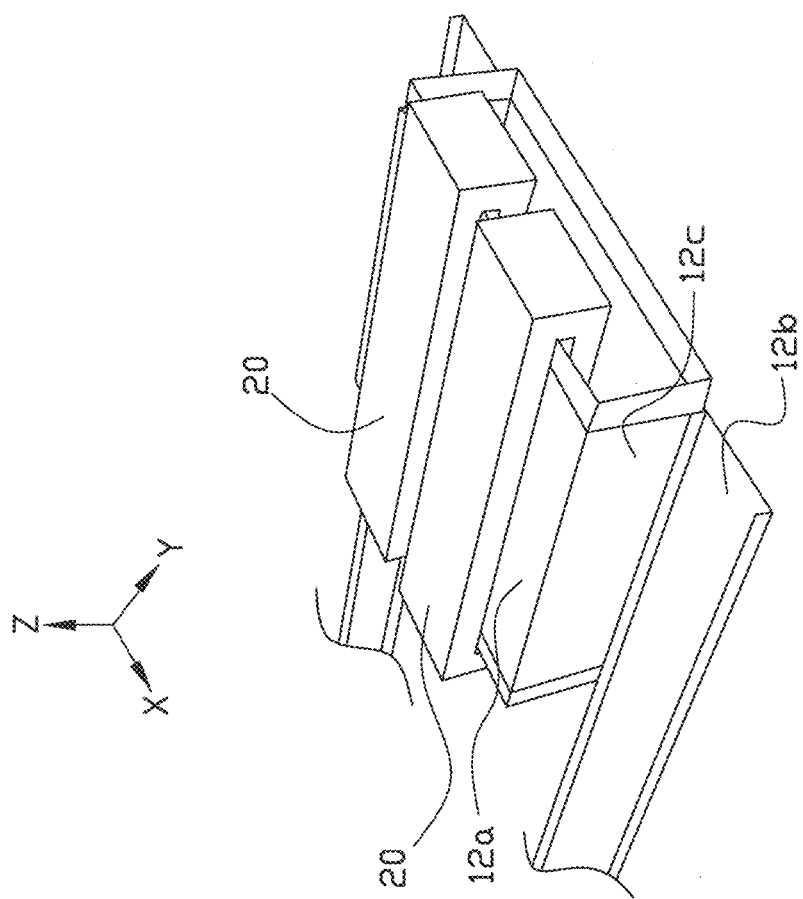
FIG. 5 is an isometric view of a pair of fixed magnetic cores around adjacent surfaces of a fixed powered coil section and a moveable passive coil section.
Figure 6A:
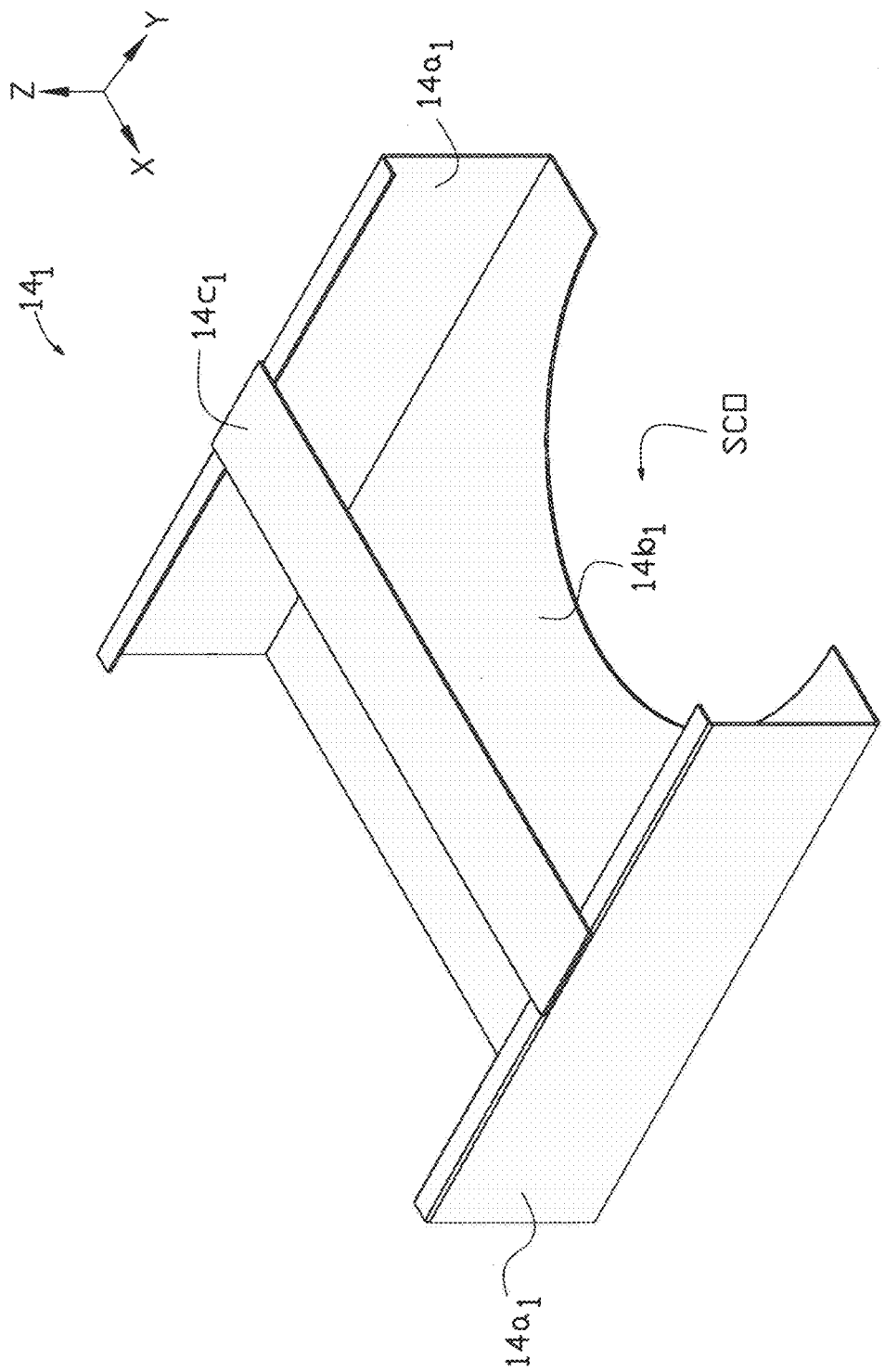
FIG. 6(a), FIG. 6(b), FIG. 6(c) and FIG. 6(d) are isometric views of alternate moveable passive coil sections used in other examples of the present invention.
Figure 6B:
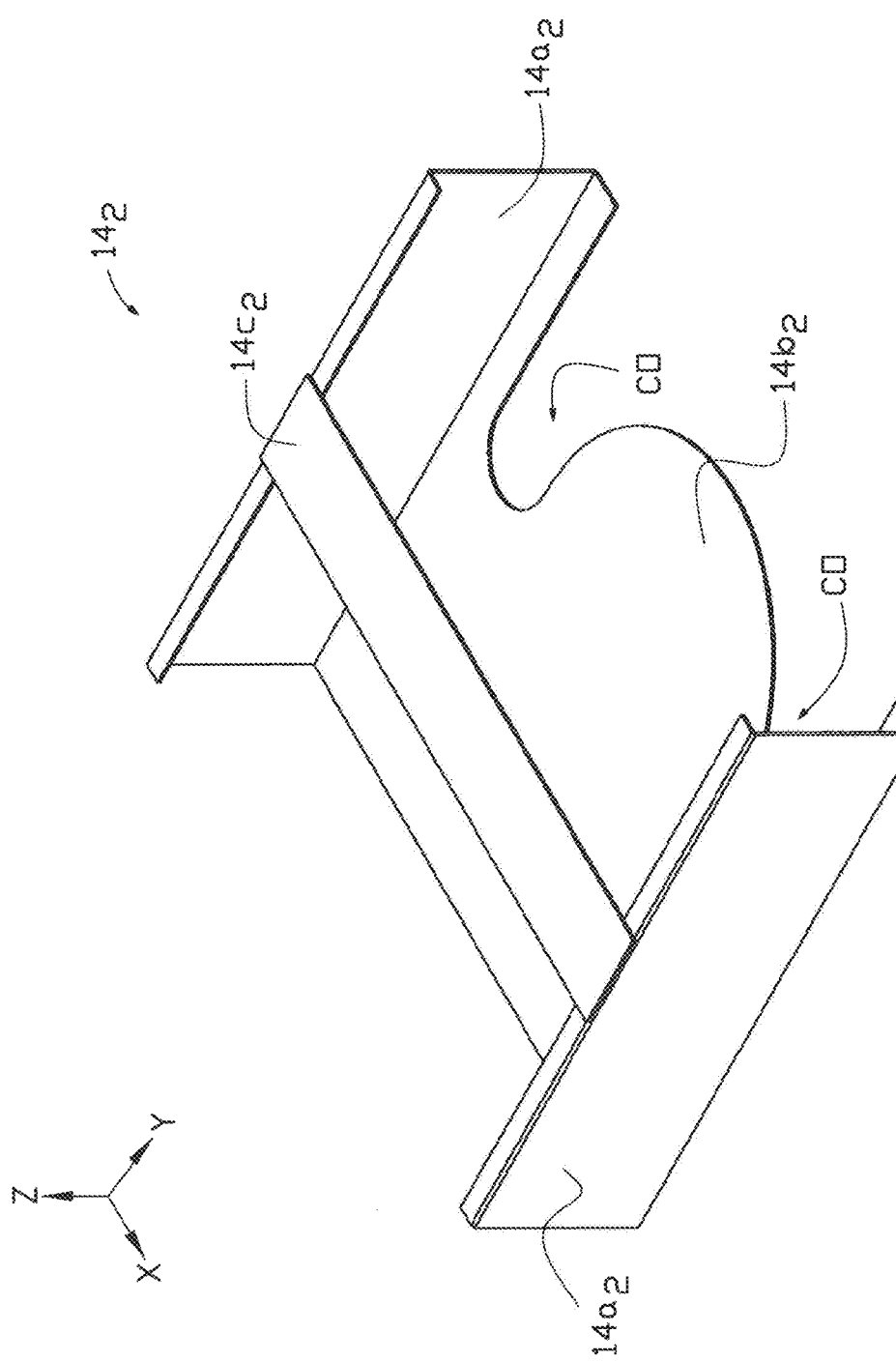
Figure 6C:
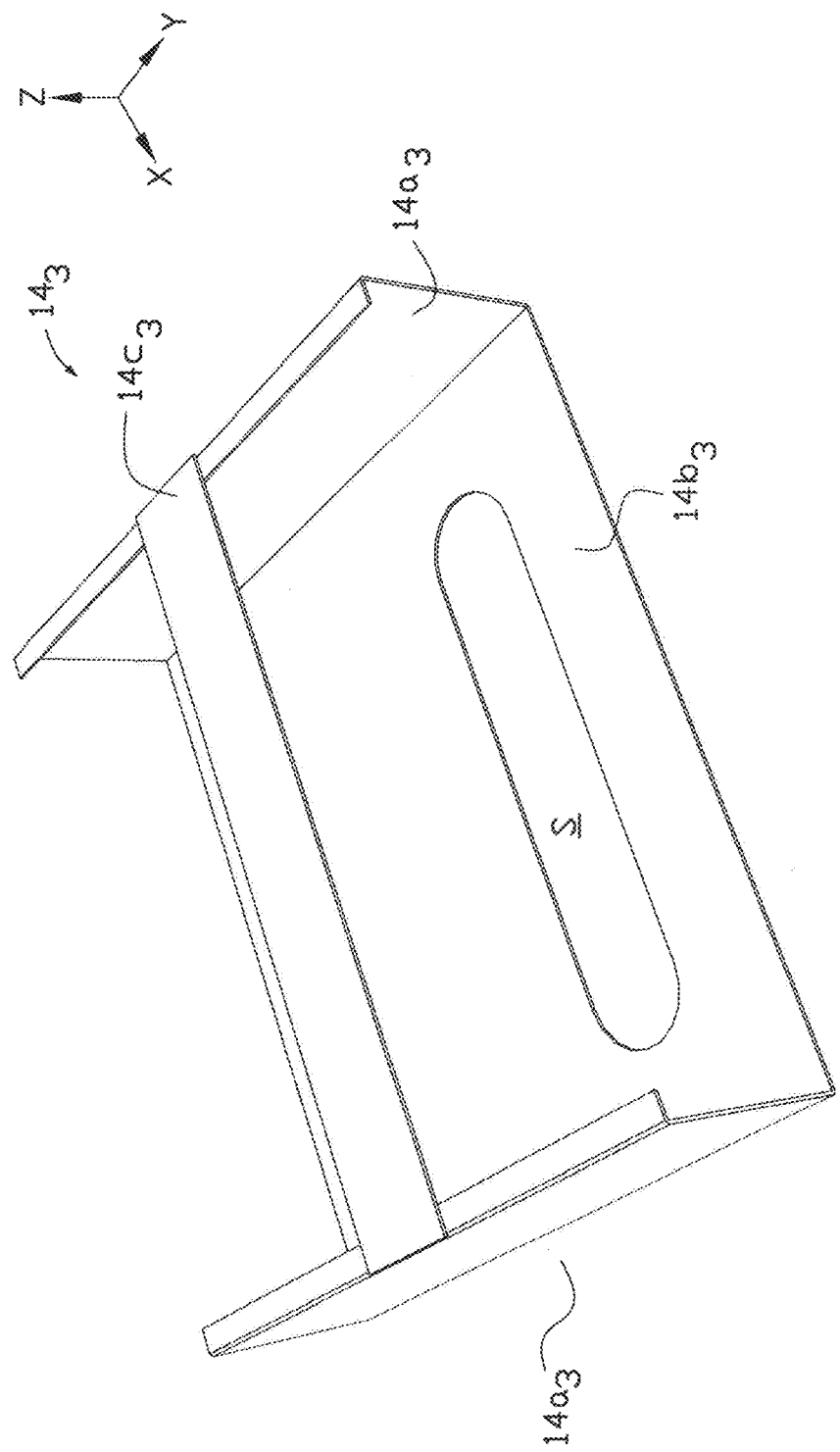
Figure 6D:
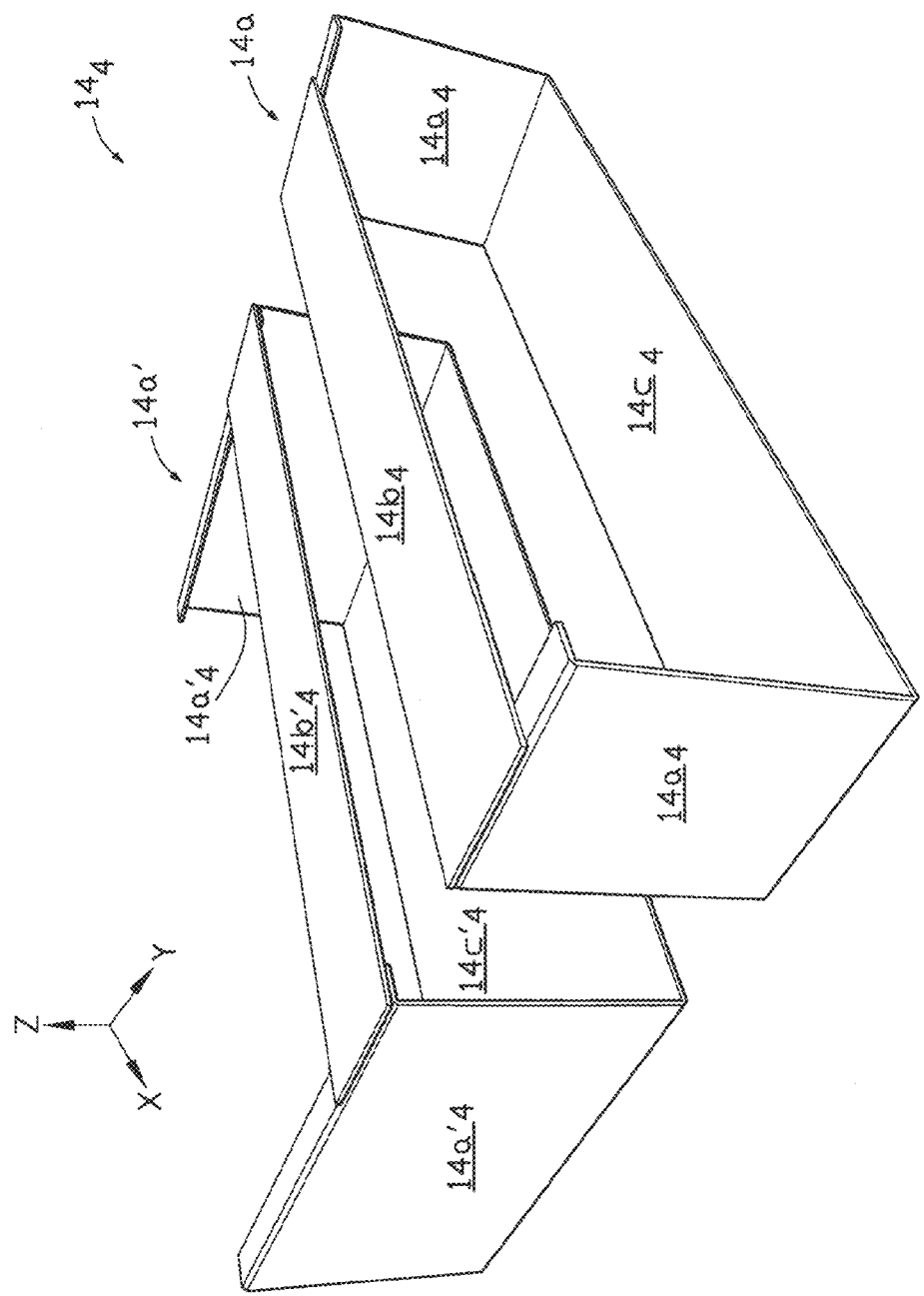

FIG. 5 illustrates the use of magnetic cores 20 to concentrate and magnify the electromagnetic coupling between a fixed powered section and associated moveable passive section enclosed by the magnetic cores. Although two cores are shown in FIG. 5 any number of cores may be used depending upon a particular application. Making slat 14*c* of the enclosed moveable passive coil section narrower (in the Y-direction) than bridge 12*a* of the fixed powered coil section allows the enclosed moveable section to move (slide) in the Y-direction relative to the fixed powered coil section to accommodate workpieces of different widths, or workpiece weaving as described above. Although the magnetic cores are shown as closed magnetic cores in FIG. 5, this is not a limiting feature of their use, as long as the arrangement of the magnetic core or cores increases the alternating magnetic flux coupling between the fixed planar coil section and at least one section of the box-like moveable coil section. The magnetic core may be formed from any suitable magnetic material with a high magnetic permeability.

FIG. 6(*a*), FIG. 6(*b*), FIG. 6(*c*) and FIG. 6(*d*) illustrate four non-limiting alternative examples of box-like moveable passive coil sections for controlling areas of flux coupling with a workpiece passing under and/or over the passive sections in order to achieve a required cross sectional temperature profile in the inductively heated workpiece. In the box-like moveable passive coil section $14_1$ shown in FIG. 6(*a*), bridge section $14b_1$ has a semicircular cutout (SCO) adjacent to one of its ends in the Y-direction, which assists in directing inductive heating flux coupling toward the ends of bridge section $14b_1$ that are adjacent to side sections $14a_1$. In the box-like moveable passive coil section $14_2$ shown in FIG. 6(*b*) bridge section $14b_2$ has cutouts (CO) adjacent to one of its ends in the Y-direction, which assists in directing inductive heating flux coupling towards the center of bridge section $14b_2$ and away from the bridge section regions adjacent to side sections $14a_2$. In the box-like moveable passive coil section $14_3$ shown in FIG. 6(c), one (or more) slots (S) are cutout of bridge section $14b_3$, which enhances inductive heating flux coupling between the slotted regions of the bridge section. In some examples of the invention the box-like moveable coil section may comprise two or more separately moveable box-like coils as illustrated, for example, in FIG. 6(d) with separate moveable box-like coils 14a and 14a' comprising box-like moveable coil section $14_4$. Each coil may be electrically isolated from each other and independently slidably connected by mechanical connection to the end of a fixed planar coil section.

Means can be provided to have the moveable passive coils sections move along with (track) the instantaneous positions of the edges of the workpiece. Non-limiting examples are sensing means that sense the instantaneous positions, or the temperature profile, of the edges of the workpiece in combination with passive coil section actuators that move the passive coil sections responsive to the output of the sensing means. For example laser beam sensors that sense the instantaneous position of the edges can output signals to a computer processing circuit that signals hydraulic actuators to move the passive coil sections accordingly. In other examples linear guides or rolls 50 (either motorized or not) may be utilized as shown, for example, in FIG. 7. In FIG. 7 only moveable passive coil sections 14" (FIG. 6(b)) are shown and not the associated fixed powered coil section that spans the transverse of workpiece 90.

Means may also be provided for adjustably moving the moveable passive coil sections in a direction (Z-direction) perpendicular to a surface of the workpiece.

Figure 10:
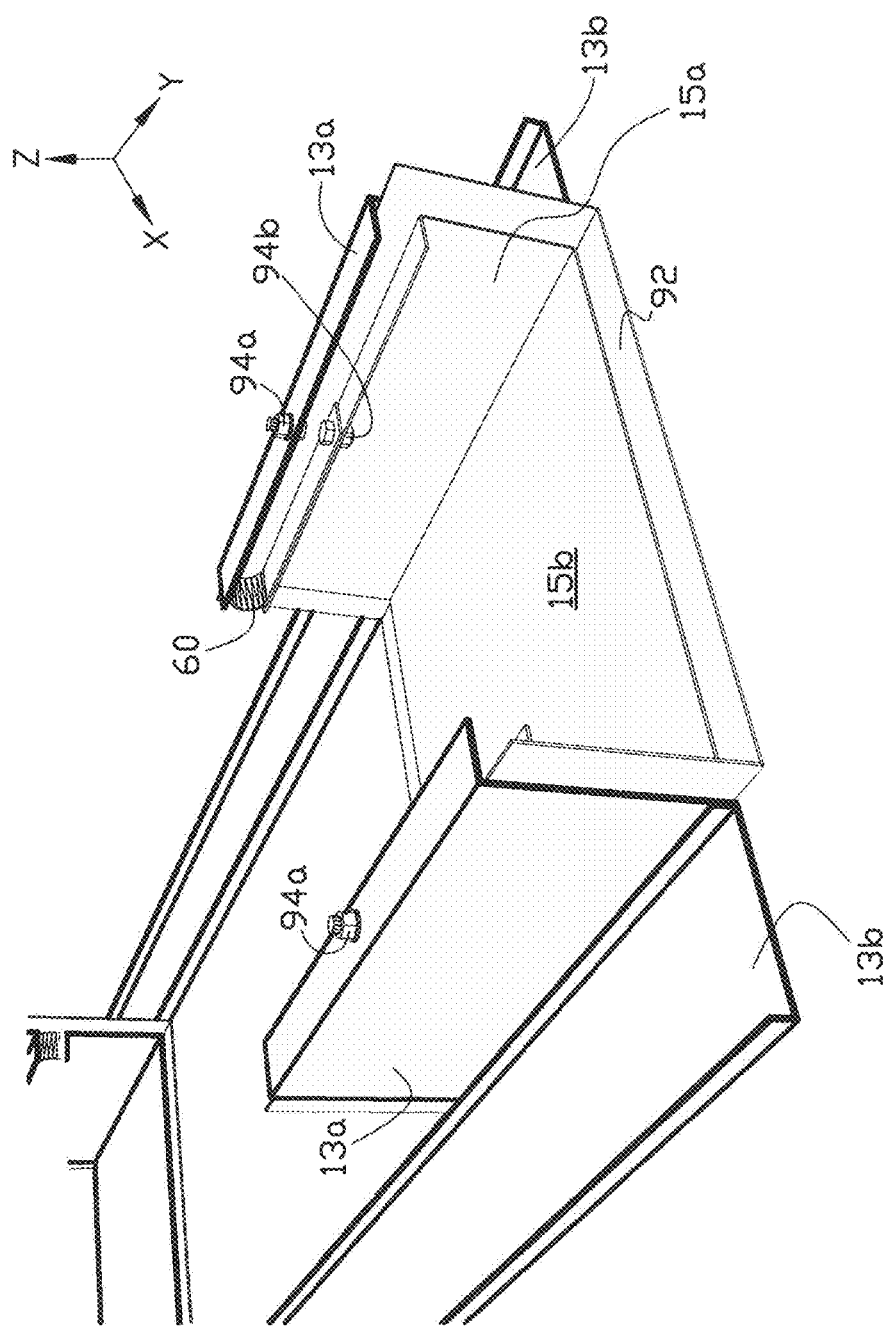
FIG. 10 is a partial isometric view of another example of a variable width transverse flux electric induction coil comprising a fixed powered coil section and moveable passive coil sections.
Figure 11:
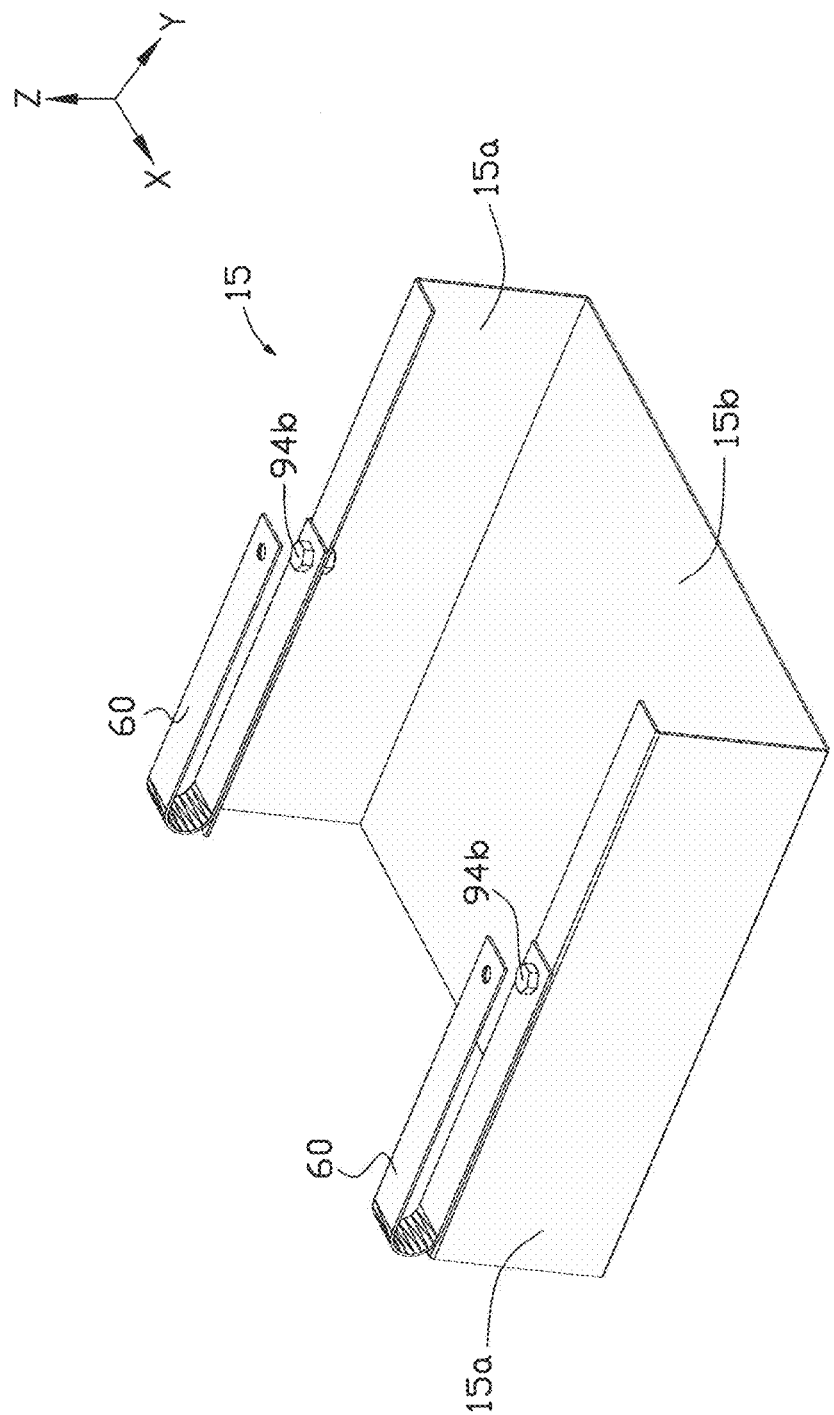
FIG. 11 is an isometric view of one example of a moveable passive coil section used with the fixed powered coil section shown in FIG. 10.
Figure 12:
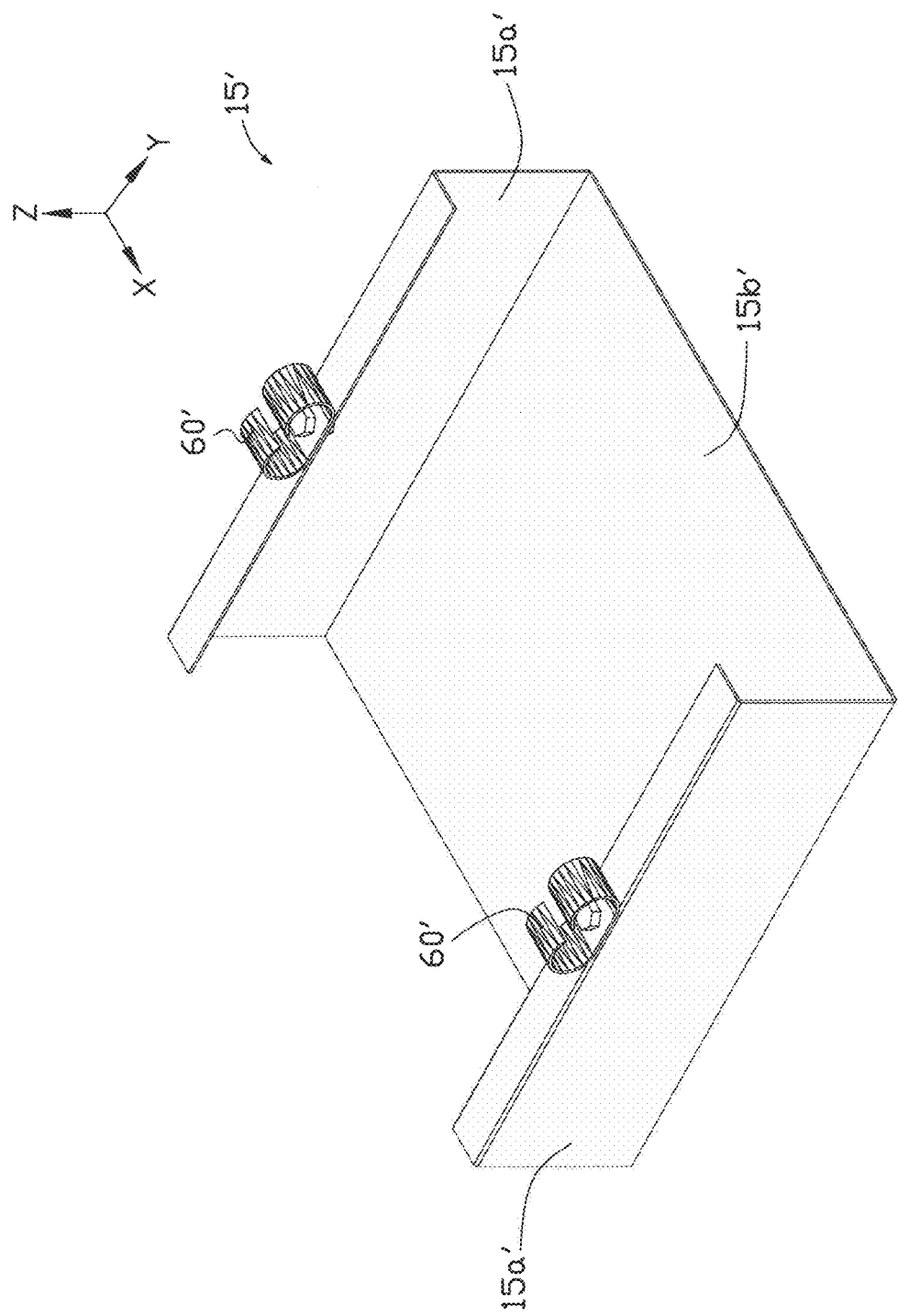
FIG. 12 is an isometric view of another example of a moveable passive coil section used with the fixed powered coil section shown in FIG. 10.

There is shown in FIG. 10 another example of the variable width transverse flux electric induction coil of the present invention wherein magnetic coupling between the fixed powered coil section and a moveable passive coil section is replaced by one or more electrically conductive paths between the fixed and moveable coil sections that are maintained as the moveable coil sections are moved relative to the fixed coil section. The fixed powered coil section comprises riser sections 13a and leg sections 13b with moveable passive coil section 15, as best seen in FIG. 11, comprising opposing side sections 15a joined by bridge section 15b. Each flexible electrical connection is shown in FIG. 10 and FIG. 11 as a flexible electrically conductive strip 60 that is folded and connected at opposing ends to the riser section of the fixed coil section and side sections 15a of the adjacent moveable coil section by suitable fasteners 94a and 94b, respectively. With this arrangement moveable passive coil section 15 can be moved in the Y direction while each flexible electrically conductive strip 60 maintains an electrical conducting path between the fixed and associated moveable coil sections. Electrical insulation 92 of any type, including air, is provided between opposing surfaces of the fixed and moveable coil sections to prevent short circuiting the opposing coil sections. With this arrangement a fixed coil bridge section and moveable coil slat section are not required. An alternative moveable coil section 15', comprising side sections 15a' and bridge section 15b', is shown in FIG. 12 where the flexible electrically conductive strip is replaced by spring electrical contacts 60' connected to the moveable coil section. These spring electrical contacts make physical contact with opposing surfaces of the fixed coil's riser sections when moveable coil section 15' is inserted between the risers, and therefore maintain an electrical connection between the adjacent fixed and moveable coil sections when the moveable section is moved in the Y direction. The flexible electrically conductive strips are but two examples of methods of maintaining an electrical connection between a fixed powered coil section and an adjacent moveable passive coil section.

Figure 13C:
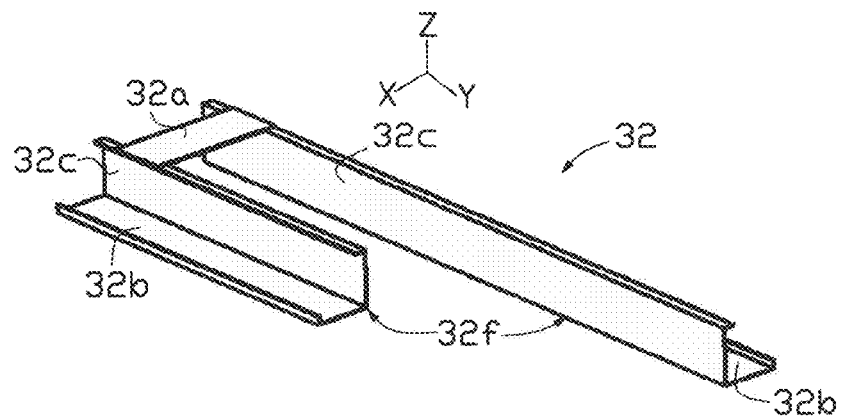
Figure 13D:
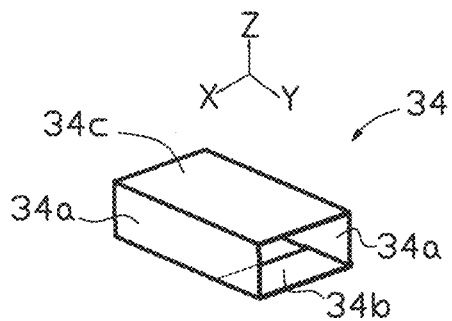
Figure 14D:
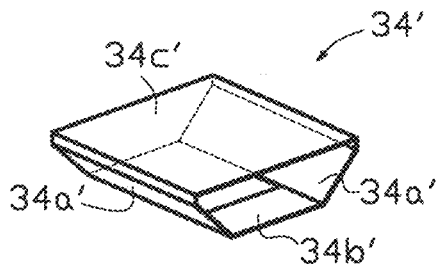
Figure 15D:
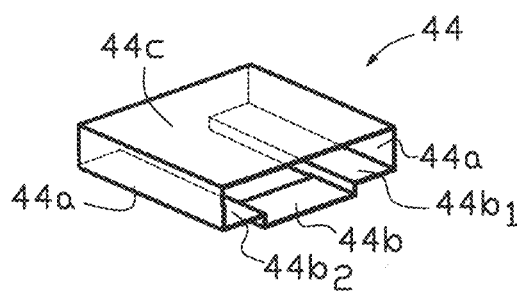
Figure 13E:
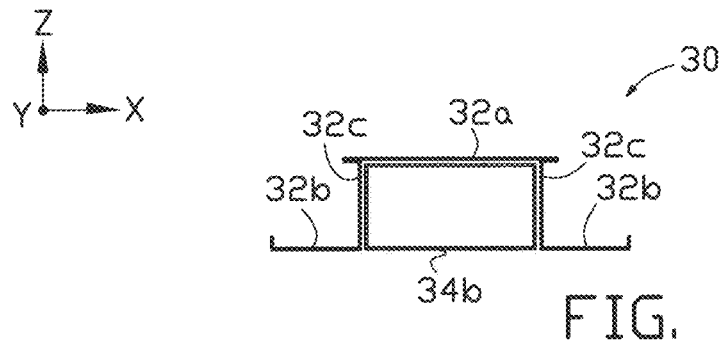
Figure 14E:
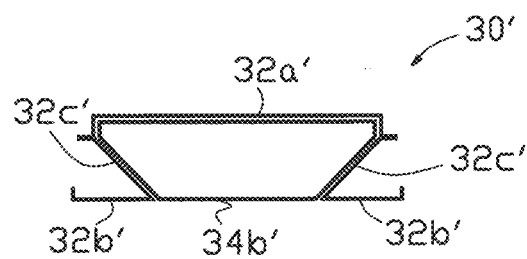
Figure 15E:
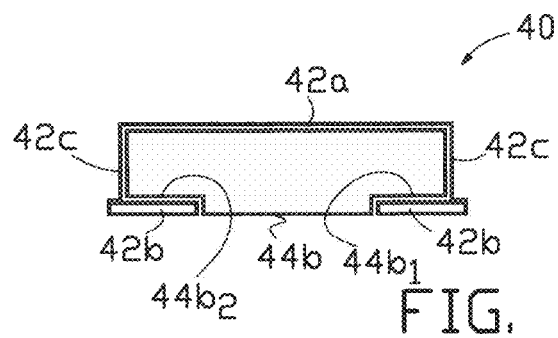

FIG. 13(a) through FIG. 13(e) illustrate another example of the transverse flux electric induction coil assembly 30 of the present invention. Only a partial view of the coil is shown to illustrate the typical fixed powered coil section 32 in relation to box-like moveable passive coil section 34 at one end of the coil. The coil assembly is spatially oriented for use as an upper induction coil with the workpiece positioned below the coil assembly. In this example each riser section 32c of fixed coil section 32 optionally extends over the entire length, L, of a transverse leg section 32b, and the box-like moveable passive coil section 34 comprises opposing side sections 34a joined by slat bridge section 34b, and section 34c, which connects opposing side sections 34a. Box-like moveable passive coil section 34 is slidably (by mechanical means) attached to fixed coil section 32, while being electrically isolated from it, and fits within the volume formed by bridge section 32a and riser sections 32c. In this arrangement magnetic flux generated around slat bridge section 34b couples with the workpiece to inductively heat the workpiece. FIG. 13(a) shows moveable passive coil section 34 fully retracted into the fixed coil section and FIG. 13(b) shows the moveable passive coil section fully extended from the fixed coil section. Moveable passive coil section 34 may also be used with any fixed powered coil section as previously described.

Figure 14C:
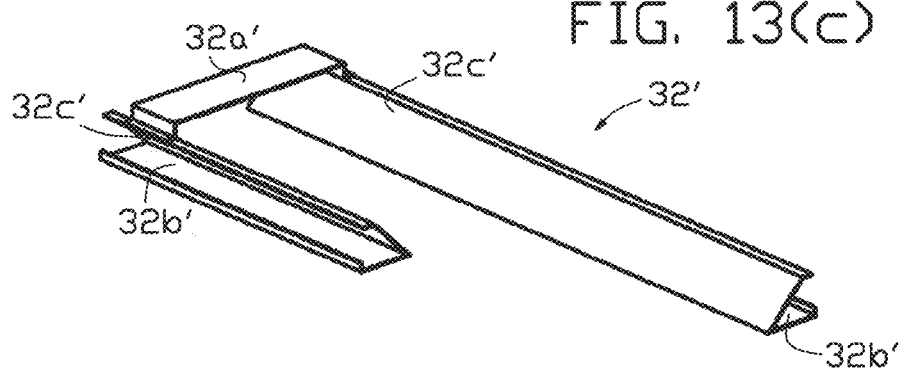
Figure 15C:
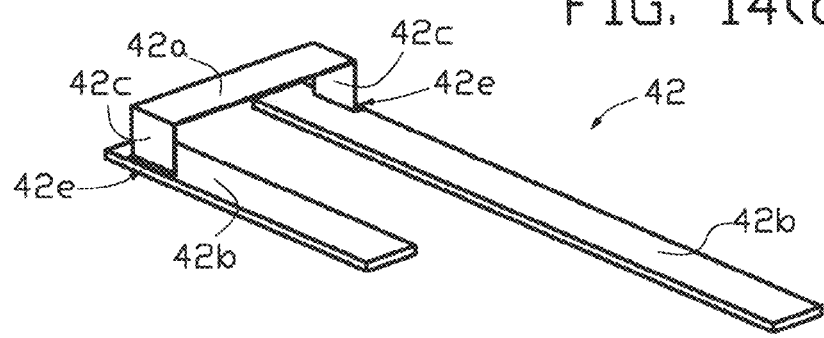

Another alternative example of the transverse flux electric induction coil assembly 30' of the present invention is illustrated in partial view in FIG. 14(a) through FIG. 14(e). This example is similar to the example in FIG. 13(a) through FIG. 13(e) except that riser sections 32c' are angled off from the vertical (Z-axis) to form an acute angle with leg sections 32b'. In this example box-like moveable passive coil section 34' has a trapezoidal shape. Moveable passive coil section 34' is slidably (by mechanical means) attached to fixed coil section 32' and fits within the volume formed by bridge section 32a' and riser sections 32c'. FIG. 14(a) shows moveable passive coil section 34' fully retracted into the fixed coil section and FIG. 14(b) shows the moveable passive coil section fully extended from the fixed coil section. In this arrangement magnetic flux generated around slat bridge section 34b' couples with the workpiece to inductively heat the workpiece.

FIG. 15(a) through FIG. 15(e) illustrate another example of the transverse flux electric induction coil assembly 40 of the present invention. Only a partial view of the coil is shown to illustrate the typical fixed powered coil section 42 in relation to box-like moveable passive coil section 44 at one end of the coil. The coil assembly is spatially oriented for use as an upper induction coil with the workpiece positioned below the coil assembly. In this example each riser section 42c of fixed coil section 42 is connected to the opposing edge 42e of a leg section 42b on the side of each leg section facing away from the other leg section, as opposed to the example shown in FIG. 1 where the riser section 12c of the fixed coil section is connected to edge 12f of a leg section 12b on the side of the leg facing towards the other leg section, and similarly in FIG. 13(c) where the riser section 32c of the fixed coil section is connected to edge 32f of a leg section 32b on the side of the leg facing towards the other leg section. Box-like moveable passive coil section 44 is slidably (by mechanical means) attached to fixed coil section 42, while being electrically isolated from it, and fits within the volume formed by bridge section 42*a* and riser sections 42*c*, with bridge section 44*b* seated substantially within the same plane as leg sections 42*b*. Bridge section 44*b* of the moveable passive section also includes sections 44*b*₁ and 44*b*₂ which are positioned over the ends of leg sections 42*b*. FIG. 15(*a*) shows moveable passive coil section 44 fully retracted into the fixed coil section and FIG. 15(*b*) shows the moveable passive coil section fully extended from the fixed coil section. In this arrangement magnetic flux generated around bridge section 44*b* couples with the workpiece to inductively heat the workpiece.

Figure 16C:
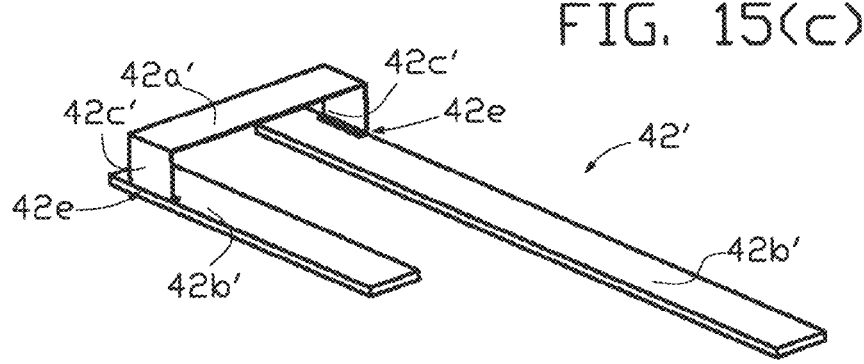
Figure 16D:
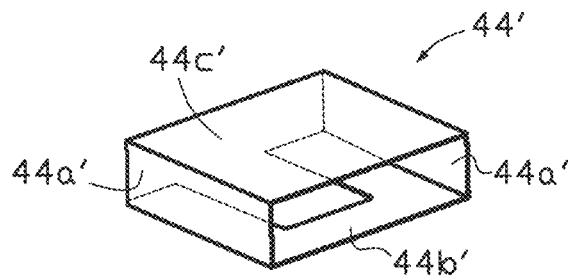
Figure 16E:
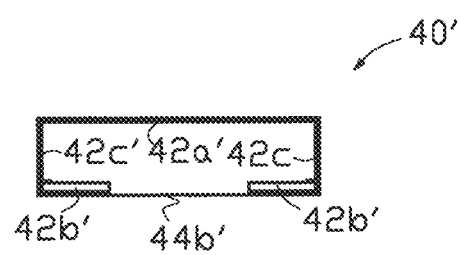

Another alternative example of the transverse flux electric induction coil assembly 40' of the present invention is illustrated in FIG. 16(*a*) through FIG. 16(*e*). This example is similar to the example in FIG. 15(*a*) through FIG. 15(*e*) except that box-like moveable passive coil section 44' is slidably (by mechanical means) attached to fixed coil section 42' and fits over and around the volume formed by bridge section 42*a'*, riser sections 42*c'*, and leg sections 42*b'*. FIG. 16(*a*) shows moveable passive coil section 44' fully retracted into the fixed coil section and FIG. 16(*b*) shows the moveable passive coil section fully extended from the fixed coil section. In this arrangement magnetic flux generated around "U" shaped bridge section 44*b'* couples with the workpiece to inductively heat the workpiece.

Figure 17C:
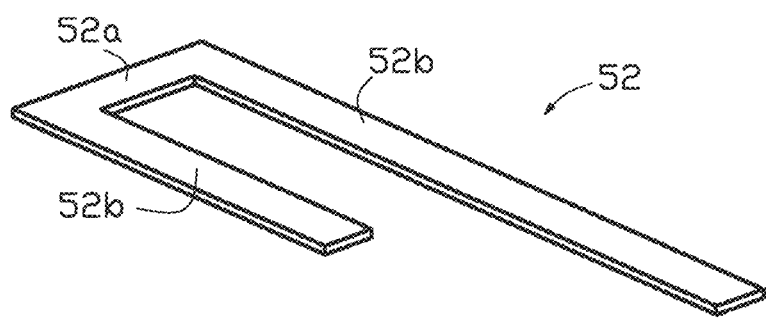
Figure 17D:
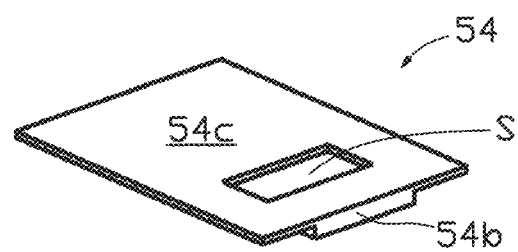

FIG. 17(*a*) through FIG. 17(*d*) illustrate another example of the transverse flux electric induction coil assembly 50 of the present invention. Only a partial view of the coil is shown to illustrate the typical fixed powered coil section 52 in relation to box-like moveable passive coil section 54 at one end of the coil. The coil assembly is spatially oriented for use as an upper induction coil with the workpiece positioned below the coil assembly. In this example bridge section 52*a* is connected directly to the opposing adjacent ends of the pair of leg sections 52*b* and is substantially co-planar with the pair of opposing leg sections. Box-like moveable passive coil section 54 is generally flat in shape with slat bridge section 54*b* seated substantially within the same plane as leg sections 52*b* and includes optional slot S. In shape moveable passive coil section 54 represents a box-like shape wherein the height (Z-direction) of the box has degenerated to the flat shape shown in FIG. 17(*d*). Passive coil section 54 is slidably (by mechanical means) attached to fixed coil section 52, while being electrically isolated from it, and slides over the bridge and leg sections comprising the fixed coil section. FIG. 17(*a*) shows moveable passive coil section 54 fully retracted into fixed coil section 52 and FIG. 17(*b*) shows the moveable passive coil section fully extended from the fixed coil section.

Figure 18C:
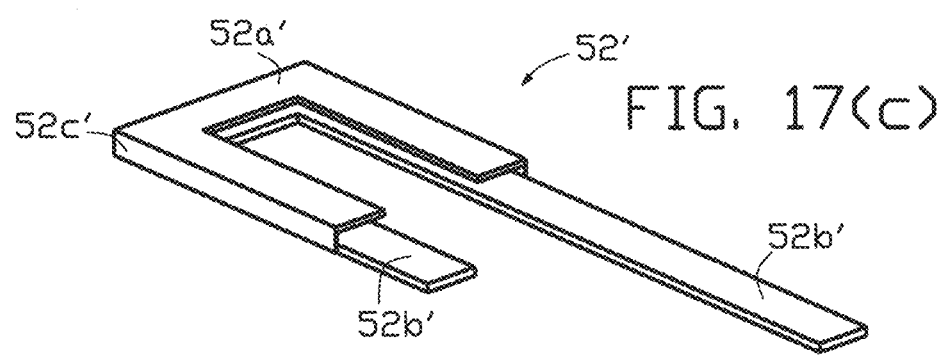
Figure 18D:
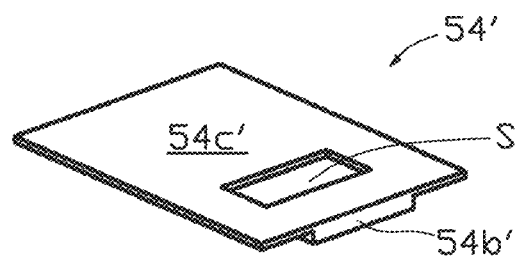

FIG. 18(*a*) through FIG. 18(*d*) illustrate another example of the transverse flux electric induction coil assembly 50' of the present invention. Only a partial view of the coil is shown to illustrate the typical fixed powered coil section 52' in relation to box-like moveable passive coil section 54' at one end of the coil. The coil assembly is spatially oriented for use as an upper induction coil with the workpiece positioned below the coil assembly. In this example fixed coil section 52' comprises leg sections 52*b'* in FIG. 18(*c*) in combination with riser sections 52*c'* and "U" shaped bridge section 52*a'*. Box-like moveable passive coil section 54' in FIG. 18(*d*) is similar to moveable passive coil section 54 shown in FIG. 17(*d*).

Figure 19C:
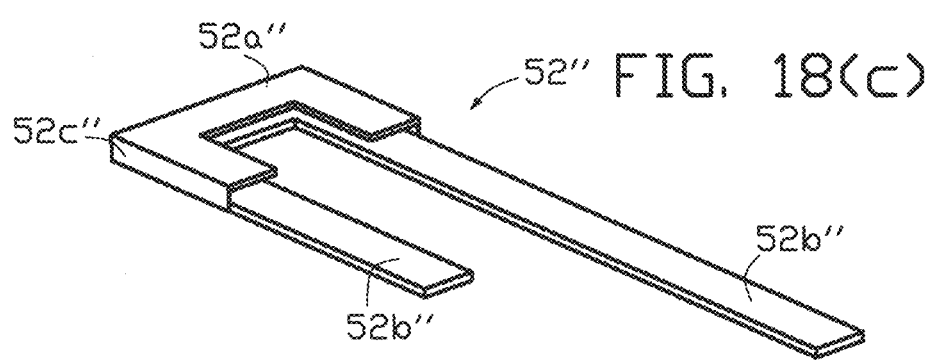
Figure 19D:
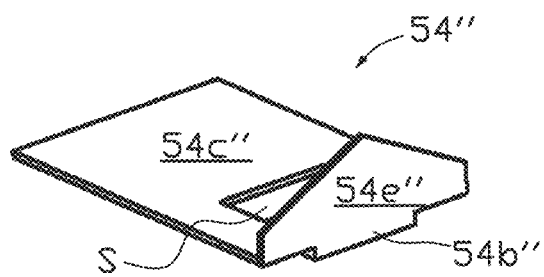

Another alternative example of the transverse flux electric induction coil assembly 50" of the present invention is illustrated in FIG. 19(*a*) through FIG. 19(*d*). This example is similar to the example in FIG. 18(*a*) through FIG. 18(*d*) except that moveable coil section 54" has an additional feature, namely shield or flap section 54*e"* which is attached to the interior end of slat bridge section 54*b"* and oriented at an angle from legs 52*b"* of fixed powered coil section 52". A flap section can be combined with any of the other box-like moveable passive coil sections of the present invention.

All of the transverse flux coils illustrated in figure groups 13 through 19 above represent an upper induction coil with reference to a workpiece positioned below the coil. Box-like moveable coil sections are shown at one end of the coil assembly and the length of the leg sections are shown only in partial lengths to shown the detail at one end of the coil unless the coil is asymmetric in configuration as discussed above.

Comparatively speaking the alternative examples of the invention shown in figure groups 15 through 19 can be applied to increase the magnetic flux emitting from the leg sections. With a thin leg section the reluctance is lower than with the arrangements shown in figure groups 13 and 14. Consequently the same magnitude of current in the leg sections will result in higher heating temperatures for the workpiece with the arrangements in figure groups 15 through 19. With the box-like moveable coil section shown in figure groups 13 through 16 there is greater control of the cross sectional heating profile of the workpiece by changing the shape of the moveable coil section adjacent to the workpiece.

Figure 20:
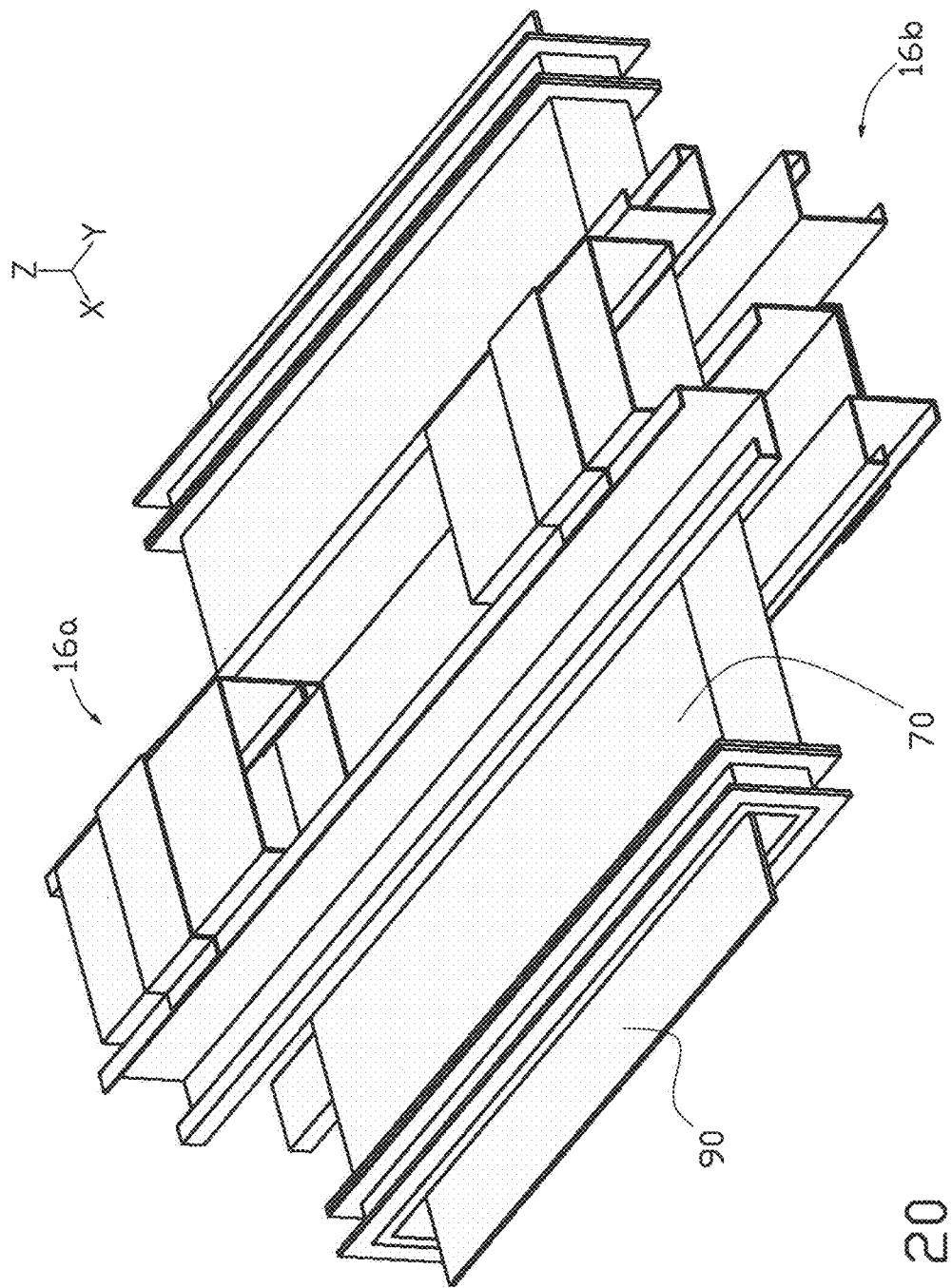
FIG. 20 illustrates one example of a pair of transverse flux induction coils of the present invention used to inductively heat a workpiece passing through a gastight enclosure where the coils are located exterior to the enclosure.

FIG. 20 illustrates another example of a transverse flux electric induction coil of the present invention utilized in a gastight induction furnace application. An elongated electrically conductive workpiece 90 can pass through substantially gastight enclosure 70. A pair of transverse flux electric induction coils of the present invention, such as but not limited to coils 16*a* and 16*b*, are transversely located on the opposing exterior sides of the enclosure that are parallel to the plane of the workpiece. The gastight enclosure is formed from an electromagnetically transparent material at least in the regions where the alternating magnetic flux field can penetrate the enclosure and couple with the workpiece to inductively heat the workpiece.

Figure 21:
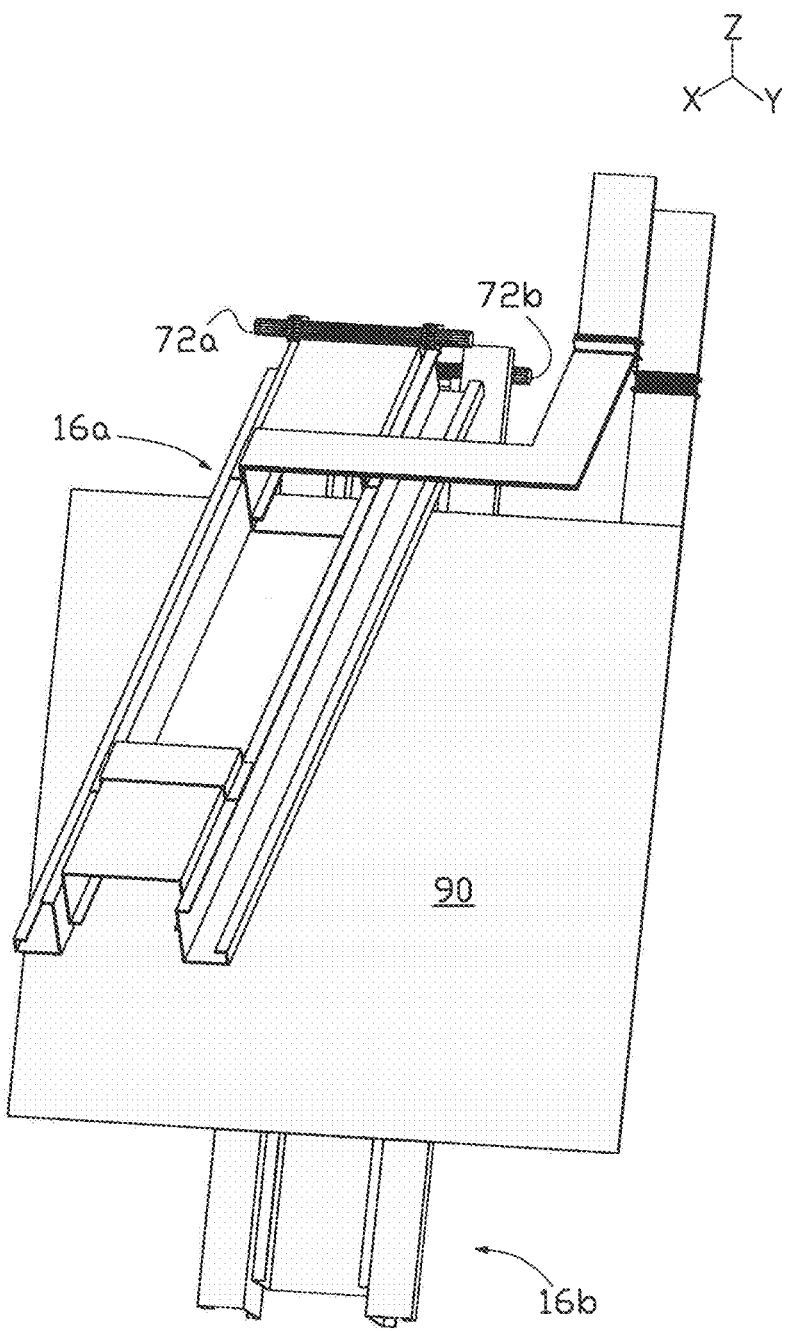
FIG. 21 illustrates an arrangement of a pair of transverse flux induction coils of the present invention that are hingeably mounted with the pair of coils shown in the opened position and a workpiece positioned between the coils.

FIG. 21 illustrates another example of a transverse flux electric induction coil of the present invention. Each of a pair of transverse flux electric induction coils such as, but not limited to those shown in FIG. 3, are attached at one transverse end to rotating apparatus 72*a* or 72*b* to rotate the transverse flux induction coil around an axis parallel to the movement of the workpiece. This arrangement is useful for accommodating cleaning of the insides (facing workpiece 90) of the coils.

In the above examples of the invention the workpiece and transverse flux induction coils are generally horizontal in orientation but this is not a limiting feature of the invention. For example the workpiece and transverse flux induction coils may be vertically oriented in a workpiece coating process where the workpiece passes vertically between a pair of flux induction coils to inductively heat the workpiece so that evaporative coating of the workpiece is achieved.

In the above examples of the invention each transverse flux induction coil comprises a fixed powered coil section and a pair of moveable passive coil sections. In some applications the transverse flux induction coil may comprise a fixed powered coil section and one moveable passive coil section located under a bridge of the fixed section at only one end of the fixed powered coil section.

The above examples of the invention have been provided merely for the purpose of explanation and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects.

The invention claimed is:

1. A transverse flux electric induction coil comprising:
a fixed planar coil section formed from at least a pair of fixed transverse sections co-planarly spaced apart from each other to form a fixed coil section plane, the pair of fixed transverse sections joined together near each adjacent opposing end regions of the pair of fixed transverse sections by a joining fixed bridge section to form at least a one turn coil, the fixed planar coil section connected to an alternating current power source to create an alternating magnetic flux field around the fixed planar coil section; and
at least one box-shaped moveable coil section electrically isolated from, and slidably connected by mechanical connection to, at least one end of the fixed planar coil section while being closely electromagnetically coupled with the alternating magnetic flux field at least around the joining fixed bridge section, the at least one box-shaped moveable coil section comprising a planarly-oriented coil section slidably connected by mechanical connection over each adjacent opposing end regions of the pair of fixed transverse sections and the joining fixed bridge section.

2. The transverse flux electric induction coil of claim 1 wherein:
the pair of fixed transverse sections joined together to the joining fixed bridge section by a separate riser section connected between each one of the pair of fixed transverse sections near each end of each one of the pair of fixed transverse sections and the joining fixed bridge section, each of the separate riser sections extending away from the fixed coil section plane formed by the pair of fixed transverse sections, and the joining fixed bridge section being "U" shaped; and
the planarly-oriented coil section having a flat shape with a slat bridge section seated between the pair of fixed transverse sections within the fixed coil section plane formed by the pair of fixed transverse sections, the planarly-oriented coil section slidable between the separate riser sections and under the joining fixed bridge section.

3. The transverse flux electric induction coil of claim 2 further comprising a slot in the planarly-oriented coil section.

4. The transverse flux electric induction coil of claim 2 further comprising a shield section attached to an interior end of the slat bridge section oriented at an angle from the pair of fixed transverse sections.

5. The transverse flux electric induction coil of claim 1 wherein the planarly-oriented coil section having a flat shape with a slat bridge section seated between the pair of fixed transverse sections within the fixed coil section plane formed by the pair of fixed transverse sections, the planarly-oriented coil section slidable over each adjacent opposing end regions of the pair of fixed transverse sections and the joining fixed bridge section.

6. The transverse flux electric induction coil of claim 5 further comprising a slot in the planarly-oriented coil section.

7. The transverse flux electric induction coil of claim 5 further comprising a shield section attached to an interior end of the slat bridge section oriented at an angle from the pair of fixed transverse sections.

8. The transverse flux electric induction coil of claim 1 further comprising at least one magnetic core positioned to increase the alternating magnetic flux field coupling between the fixed planar coil section and the planarly-oriented coil section.

9. The transverse flux electric induction coil of claim 1 further comprising a moveable coil section positioning apparatus for adjusting a position of the planarly-oriented coil section relative to a transverse position of a workpiece passing above or below the transverse flux electric induction coil.

10. The transverse flux electric induction coil of claim 1 wherein the transverse flux electric induction coil is connected to a rotating apparatus to rotate the transverse flux electric induction coil around an axis parallel to a movement of a workpiece passing above or below the transverse flux electric induction coil.

11. The transverse flux electric induction coil of claim 1 wherein the one turn coil is a multi-loop coil.

12. A transverse flux electric induction furnace comprising:
a gastight enclosure through which an elongated electrically conductive workpiece can pass through;
a pair of transverse flux electric induction coils transversely located on opposing exterior sides of the gastight enclosure parallel to a plane of the elongated electrically conductive workpiece, each one of the pair of transverse flux electric induction coils comprising:
a fixed planar coil section formed from at least a pair of fixed transverse sections co-planarly spaced apart from each other, the pair of fixed transverse sections joined together near each adjacent opposing end regions of the pair of fixed transverse sections by a joining fixed bridge section to form at least a one turn coil, the fixed planar coil section connected to an alternating current power source to create an alternating magnetic flux field around the fixed planar coil section; and
at least one box-shaped moveable coil section electrically isolated from, and slidably connected by mechanical connection to, at least one end of the fixed planar coil section while being closely electromagnetically coupled with the alternating magnetic flux field at least around the joining fixed bridge section, the at least one box-shaped moveable coil section comprising a planarly-oriented coil section slidably connected by mechanical connection over each adjacent opposing end regions of the pair of fixed transverse sections and the joining fixed bridge section; and
the gastight enclosure formed from an electromagnetically transparent material at least in a region of the gastight enclosure where the alternating magnetic flux field can penetrate the gastight enclosure and couple with the elongated electrically conductive workpiece.

13. The transverse flux electric induction coil of claim 12 wherein each one of the pair of transverse flux electric induction coils is connected to a rotating apparatus to rotate the pair of transverse flux electric induction coils around an axis parallel to a movement of the elongated electrically conductive workpiece passing through the gas tight enclosure.

14. A method of inductively heating at least one side of a flat electrically conductive workpiece, the method comprising:

forming a transverse flux electric induction coil from a fixed planar coil section formed from at least a pair of fixed transverse sections co-planarly spaced apart from each other, the pair of fixed transverse sections joined together near each adjacent opposing end regions of the pair of fixed transverse sections by a joining fixed bridge section to form at least a one turn coil, the fixed planar coil section connected to an alternating current power source to create an alternating magnetic flux field around the fixed planar coil section; and at least one box-shaped moveable coil section electrically isolated from, and slidably connected by mechanical connection to, at least one end of the fixed planar coil section while being closely electromagnetically coupled with the alternating magnetic flux field at least around the joining fixed bridge section, the at least one box-shaped moveable coil section comprising a planarly-oriented coil section slidably connected by mechanical connection over each adjacent opposing end regions of the pair of fixed transverse sections and the joining fixed bridge section;

bringing a surface of the at least one side of the flat electrically conductive workpiece near to the pair of fixed transverse sections of the transverse flux electric induction coil;

selecting an output frequency for the alternating current power source; and sliding the planarly-oriented coil section relative to the fixed planar coil section formed from the at least one pair of fixed transverse sections to inductively heat a transverse region of the flat electrically conductive workpiece longitudinally passing near to the at least one pair of fixed transverse sections.

* * * * *